US012277836B2

(12) United States Patent
Tietzen et al.

(10) Patent No.: US 12,277,836 B2
(45) Date of Patent: Apr. 15, 2025

(54) ATTENDEE DIRECTED DONEE DONATION DEFINED BY BOOKMAKER DONOR TO INCENT ATTENDANCE OF A VIRTUAL REALITY GAMBLING METAVERSE COMPETITION

(71) Applicant: Edatanetworks, Inc., Edmonton (CA)

(72) Inventors: Terrance Patrick Tietzen, Edmonton (CA); Matthew Arnold Macpherson Bates, Edmonton (CA)

(73) Assignee: EDATANETWORKS INC, Edmonton (CA)

( * ) Notice: Subject to any disclaimer, the term of this patent is extended or adjusted under 35 U.S.C. 154(b) by 0 days.

(21) Appl. No.: 17/965,178

(22) Filed: Oct. 13, 2022

(65) Prior Publication Data

US 2024/0242568 A1 Jul. 18, 2024

Related U.S. Application Data

(63) Continuation-in-part of application No. 17/963,295, filed on Oct. 11, 2022.

(60) Provisional application No. 63/341,487, filed on May 13, 2022, provisional application No. 63/256,976, filed on Oct. 18, 2021.

(51) Int. Cl.
*G07F 17/32* (2006.01)
*G06Q 50/34* (2012.01)

(52) U.S. Cl.
CPC ......... *G07F 17/3239* (2013.01); *G06Q 50/34* (2013.01); *G07F 17/3211* (2013.01); *G07F 17/3288* (2013.01)

(58) Field of Classification Search
CPC .. G07F 17/3244; G07F 17/3288; G06Q 50/34
See application file for complete search history.

(56) References Cited

U.S. PATENT DOCUMENTS

2009/0327122 A1* 12/2009 Isac ........................ G06Q 40/00 463/25
2015/0011305 A1* 1/2015 Deardorff ........... G07F 17/3255 463/26
2017/0287281 A1* 10/2017 Takeda ................ G07F 17/3258
2020/0334959 A1* 10/2020 Nelson ................ G07F 17/3211

* cited by examiner

*Primary Examiner* — Lawrence S Galka
(74) *Attorney, Agent, or Firm* — DESANDRO LAW GROUP PLLC; Bradley K. DeSandro

(57) ABSTRACT

A VR headset wearing real world wagerer pays a real world booking entity for virtual access to watch a virtual reality competition taking place in real time in a metaverse environment, and thereafter places a real world wager with the real world booking entity on a possible outcome of the virtual reality competition. If the possible outcome actually occurs such that the wagerer wins the wager, and if the possible outcome actually occurred at a time when the probability of the possible outcome actually occurring as set by the booking entity did not exceed a predetermined winning odds threshold, then the booking entity makes a donation to an affinity entity selected by the wagerer, where the donation is an amount that may be derived using a currency amount of the wager and at least one of the probability of the outcome actually occurring at the time when the outcome actually occurred and the predetermined winning odds threshold.

20 Claims, 13 Drawing Sheets

ATTENDEE DIRECTED DONEE DONATION DEFINED BY BOOKMAKER DONOR TO INCENT ATTENDANCE OF A VIRTUAL REALITY GAMBLING METAVERSE COMPETITION

CROSS REFERENCE TO RELATED APPLICATIONS

This US Utility Patent Application is a continuation-in-part of U.S. patent application Ser. No. 17/963,295, titled "WAGERER DIRECTED DONEE DONATION DEFINED BY BOOKMAKER DONOR", filed on Oct. 11, 2022, and this US Utility Patent Application also claims priority to: (i) U.S. Provisional Application Ser. No. 63/256,976, titled "WAGERER DIRECTED DONEE DONATION DEFINED BY BOOKMAKER DONOR", filed on Oct. 18, 2021; and (ii) U.S. Provisional Application Ser. No. 63/341,487, titled "Attendee Directed Donee Donation Defined By Bookmaker Donor To Incent Attendance Of A Virtual Reality Gambling Metaverse Competition", filed on May 13, 2022. The contents of each of the foregoing applications are fully incorporated herein by reference.

This US Utility Patent Application is related to (i) U.S. patent application Ser. No. 16/466,728, titled "Blockchain Tracking And Managing Of A Transaction Incented By A Merchant Donation To A Consumer Affinity", filed on Jun. 20, 2019, published as US Patent Application Publication Number US 2019/0392489 on Dec. 26, 2019, which claims priority to Provisional application Ser. No. 62/688,814, filed on Jun. 22, 2018; (ii) U.S. Pat. No. 11,010,787, titled "Linking a transaction between a merchant and a resident of the same vicinity to the resident viewing the merchant broadcast advertisement", filed on Aug. 1, 2018; (iii) U.S. patent application Ser. No. 17/687,621, titled "Donation Incented Real Time Payment", filed on Mar. 5, 2022; and (iv) U.S. Pat. No. 11,068,923, titled "System for loyalty program", filed on Sep. 18, 2015, the contents of which are each fully incorporated herein by reference.

FIELD

Implementations described herein generally relate to a computer-generated environment in which an automated method is performed to incent a real world spectators and wagerers to wager on a possible outcome in a game of skill, a game of chance, or a game of a combination of skill and chance by way of an incentive to the spectator and/or wagerer by a real world booking entity, where the game is a virtual reality competition in a metaverse emulating a real world competition, where the incentive is a real world donation by the real world booking entity to a real world donee selected by the real world spectator and/or wagerer respectively upon the attendance of the real world competition by the spectator and/or the occurrence of the possible outcome wagered by the wagerer.

BACKGROUND

Since the beginning of the World Wide Web, the global digital media market has grown with gaming accounting for a significant share of market revenues. Growth estimates consistently exceed twenty percent (20%) year-over-year with online gaming audiences projected to surpass 1.3 billion users in the year 2025. Growing with the global online gaming market are implementations of a metaverse. A metaverse is a virtual reality (VR) space in which users can interact with a computer-generated environment and other users. As used herein, VR is the computer-generated simulation of a three-dimensional image or environment that can be interacted with in a seemingly real or physical way by a person using special electronic equipment, such as a helmet with a screen inside or gloves fitted with sensors. VR uses computer technology to create a simulated environment which can be explored in three hundred sixty (360) degrees. Unlike traditional interfaces, VR places the user inside the virtual environment to give an immersive experience. Extended reality (XR) is all real-and-virtual combined environments and human-machine interactions generated by computer technology and wearables. By combining virtual and real landscapes, extended reality has a range of valuable use cases for various customer experiences, including the global online gaming market.

Each such metaverse, hereinafter "metaverse", will have social and economic systems in place, where user avatars can enjoy a wide range of immersed content. Unlike a video game, the overall experience doesn't pause or end. One of the most notable aspects of this new virtual world is its unprecedented interoperability. Purchases by a user's avatar can be used in a metaverse or other online metaverse games inter-operably. By way of analogy, the metaverse emulates a teleportation of a use from one online metaverse game to another.

The metaverse is popularly estimated to be an emerging trend and technology. Global spending on VR and AR, the metaverse's foundation technologies, is expected to rise. Because of this, industries like gaming, retail, arts, health-care, and blockchain are determining how to position themselves as critical players in this emerging ecosystem.

At present, there are a variety of metaverses, including those focusing on specific interests like gaming or sports. Some metaverses are a 3D social media channel with Artificial Intelligence (AI) driven messaging tailored to each user. Additionally, a metaverse can be a hub for information, entertainment, and work. Each of these will likely evolve into a next version of the internet or the World Wide Web.

In VR, complete engagement in the digital world is possible with the use of a special pair of glasses or a helmet. In Augmented Realty (AR), a digital overlay projects images and graphics onto the real world. Mixed reality (MR) technology, which combines VR and AR, allows total immersion in the metaverse. For example, a VR helmet can provide a wearer with a roller coaster simulation that provides like sensations in which the wearer can interact with virtual and physical objects, and intangible, digital items present functionalities within the simulation that allow the wearer to communicate with both.

Blockchain is a key facilitator in metaverse transactions. A blockchain is a network of computers that shares a database. The blockchain imposes a level of complexity that makes alteration of records more unlikely once the record is in the blockchain. The network constantly verifies that all database copies are identical. The metaverse enables users to buy, sell, or upgrade virtual assets such as homes, weapons, and skins in virtual space. In the metaverse, non-fungible tokens (NFT) are a new type of virtual asset that has powered much of its growth. An NFT is an intangible, digital item. An NFT can be an image, a video, or an in-game object. The blockchain records NFT owners. As such, NFT owners can trade the digital assets they represent. Some NFT collectors see these assets as cultural collectibles, while others see them as investments. Increasing NFT marketplace integration with 3D virtual worlds is likely to increase. Blockchain developers are likely to construct popular metaverse-like programs on a larger scale. For users to fully interact in the environment, many blockchain-based metaverse systems must integrate AR, VR, and Extended reality (XR) that combine all real-and-virtual environments and human-machine interactions generated by computer technology and wearables.

To further incent growth of the global online gaming market growth, there is a need in the relevant arts for systems and methods that enable wagering by wagerers within the global online gaming market, and particularly to incent wagerers participate as virtual reality wagerers in the metaverse, where the incentive would be provided by bookmaker to incent the wagers on a virtual reality competition in a computer-generated environment emulating a real world competition. These virtual reality competitions can include horse racing, dog racing, basketball, football, baseball, hockey, soccer, jai-alai, golf, boxing, rugby, cricket, auto racing, bicycle racing, tennis chess, Olympic competitions, and political (Dems vs. Reps) or entertainment competitive events, etc. While the foregoing competitions involve competitions, some virtual reality wagerers are likely to prefer to place wagers on non-team competitions where the wagerer makes wagers against the booking entity, including but not limited to poker, blackjack, craps, roulette, etc. Probabilities of the wagerer winning a wager in such non-team virtual reality competition may involve the use of a pseudo random number generator to simulate an actual, in-person non-team competition.

Booking entities compete for wagers from wagerers who wish to place wagers. One such technique by which booking entities compete for wagers who wish to place wagerers is the setting of the probability that a wagerer's wager will win the wager. This probability may be referred to as the betting odds which represent the probability of an event happening and enable the working out of how much money is to be won by the wagerer when the wager is won. The betting odds may also reveal how much the booking entity is assessing to accept a wager from a wagerer. This assessment may be referred to as "juice", "cut", "vigorish", or "vig". Moreover, betting odds can be influenced by more than the factors actually relevant to the outcome of the event. The booking entity may manipulate the betting odds to incentivize wagers on a certain side, and the sum of the probabilities for a single event can surpass 100 percent because the booking entity may choose to take a cut that is incorporated directly into the betting odds.

As an example, with betting odds of 4/1, for every One Dollar ($1 US) wagered by a wagerer, Four Dollars ($4 US) will be won by the wagerer for a win of the wager. Stated otherwise, there is a twenty five percent (25%) chance of the wagerer winning the wager, calculated by 1/(4+1)=0.25. If, however, a booking entity incented the wagerer by an offer of betting odds of 4.2/1, then the wagerer may decide to place a wager with the booking entity who is willing to offer the wagerer more favorable betting odds for placement of the wager.

While favorable betting odds may be a competitive tool used by book entities to compete against each other for wagerers to place wagers, there is a need in the relevant arts for systems and methods that enable a real world booking entity to better incent both real world spectators and real world wagerers to respectively watch and place real world wagers with the real world booking entities on virtual reality competitions in computer-generated environments emulating real world competitions.

SUMMARY

Implementations described herein relate to computer and server implemented methods for incenting both real world spectators and real world wagerers to respectively watch and place real world wagers with the real world booking entities on virtual reality competitions in computer-generated environments emulating real world competitions.

While the VR competition is executing on one or more networked computing devices, the real world wagerer is incented by a real world booking entity to place the real world wager on a possible outcome of the VR competition. Upon the occurrence of the possible outcome upon which the wager was placed by the wagerer (e.g., the real world wagerer wins the real world wager), the real world booking entity makes a defined real world donation to a real world affinity entity selected by the real world wagerer.

Each implementation of the VR competition will preferably emulate real world gaming by any known computerized methodology, including the use of pseudo random number generators. VR competitions will preferably happen within virtual, always-on, 24-7/365, cloud playing environments, each having a realistic look and feel of a sport or competition appropriate simulated venue. Moreover, each VR competition can be non-immersive, semi-immersive, and fully-immersive simulations of a real world competition.

Implementations described herein include: (i) a real world wagerer places a real world bet with a real world booking entity (e.g., makes a real world wager with a real world house who 'makes book') on a possible outcome of Virtual Reality (VR) game of skill, a VR game of chance, or a VR game of a combination of skill and chance; (ii) and if the possible outcome actually occurs such that the real world wagerer wins the real world bet (e.g., the real world wager is won); (iii) and if the possible outcome of the VR competition actually occurred at a time when the probability of the possible outcome actually occurring as set by the real world booking entity did not exceed a predetermined winning odds threshold, then the real world booking entity makes a real world donation of an amount derived using a currency amount of the real world bet wagered by the real world wagerer and a factor that is at least one of the probability of the outcome actually occurring at the time when the outcome actually occurred, and the predetermined winning odds threshold.

In variations of the foregoing implementations, the VR competition can be a contest that can be won by only one of plurality of real world contestants each having a real world geographic location (e.g., a real world place of residence), the real world bet placed by the real world wagerer with the real world booking entity can be that one real world contestant will win the contest, the real world wagerer may have designated a particular real world affinity entity having a geographic location, and the real world booking entity will then make the real world donation to the real world affinity entity designated by the real world wagerer only if a distance between the geographic location of the affinity entity designated by the wagerer and the geographic location of the one contestant does not exceed a predetermined travel threshold. In such variations, the predetermined travel threshold can be derived using a web mapping platform using a navigation algorithm, the geographic location of the affinity designed by the wagerer, the geographic location of one or more of the real world contestants upon which the bet was placed by the wagerer; and one or more travel modes used by the navigation algorithm.

In further variations of the foregoing implementations, the VR competition can be a contest that can be won by only one of a first team and a second team, the bet placed by the real world wagerer with the real world booking entity is that the first team will win the contest, at the time when the possible outcome actually occurred, there was a number of positive points for a spread bet that the first team would win the contest as set by the real world booking entity, and the real world wagerer won the bet only when the first team won the contest by a number of points greater than the positive points for the spread bet.

In still further variations of the foregoing implementations, the VR competition can be a contest that can be won by only one of a first team and a second team, the bet placed by the real world wagerer with the real world booking entity is that the second team will win the contest, at the time when the possible outcome of the VR competition actually occurred, there was a number of positive points for a spread bet that the first team would win the contest as set by the real world booking entity, and the real world wagerer won the bet only when the second team lost the game to the first team by less than the number of positive points for the spread bet that the first team would win the contest.

Other implementations described herein relate to one or more queries, including: (i) if a real world wagerer places a bet with a real world booking entity on a possible outcome of a VR competition of skill, a VR competition of chance, or a VR competition of a combination of skill and chance, (ii) and if the possible outcome does not actually occur such that the real world wagerer losses the bet, (iii) and if, at the time when the possible outcome of the VR competition did not actually occur, a difference in the odds between the possible outcome actually occurring as set by the real world booking entity and the outcome that actually did occur as set by the real world booking entity was less than a predetermined losing odds threshold, then the real world booking entity makes a real world donation of an amount derived using a currency amount of the bet and a factor that includes at least one of the difference in the odds between the possible outcome actually occurring and the outcome that actually did occur and the predetermined losing odds threshold.

Still further variations on the foregoing implementations include deriving a real world donation to be made by the real world booking entity to the real world affinity entity designated by the real world wagerer using a booking entity donation business rule. By way of example, and not by way of limitation, the booking entity donation business rule may include the real world booking entity making one or more choices, including: (i) a choice to offer the incentive of the booking entity to the affinity entity designated by the wagerer for a predetermined time period, (ii) a choice of a predetermined percentage of the amount of the wagerer's winnings that the booking entity will donate to the affinity entity designated by the wagerer, (iii) a choice of a maximum amount that is donated to the affinity entity designated by the wagerer, (iv) a choice of the predetermined winning odds threshold, (v) a choice of the predetermined losing odds threshold, and (vi) a choice of the predetermined travel threshold.

It will be appreciated that the foregoing summary merely describes exemplary, illustrative and non-limiting implementations.

BRIEF DESCRIPTION OF THE DRAWINGS

Non-limiting and non-exhaustive aspects are described with reference to the following figures, wherein like reference numerals refer to like parts throughout the various figures unless otherwise specified.

Figures 1A, 1B, 1C:
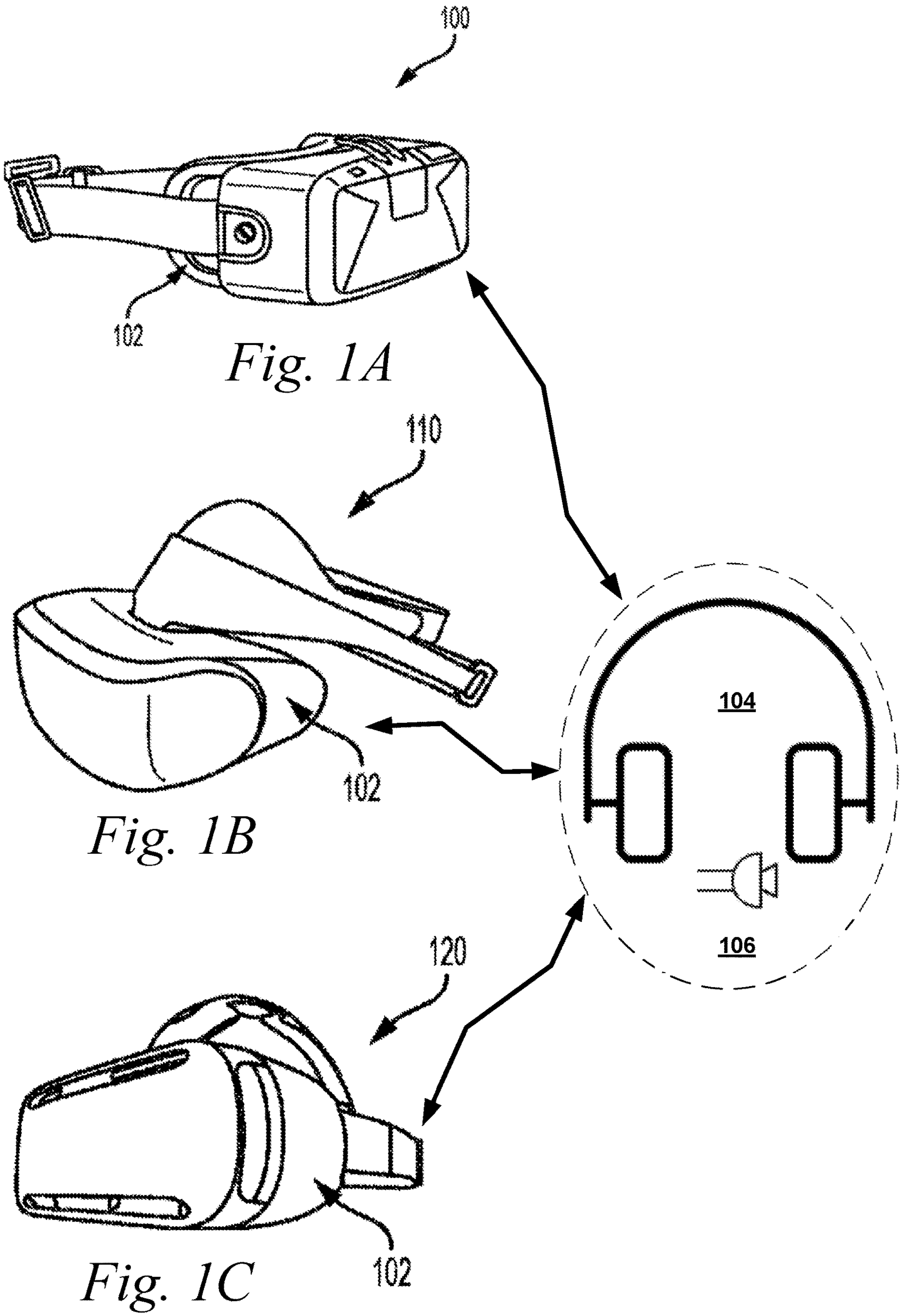
FIGS. 1A-1C shows a plurality of exemplary virtual reality headsets.
Figure 2:
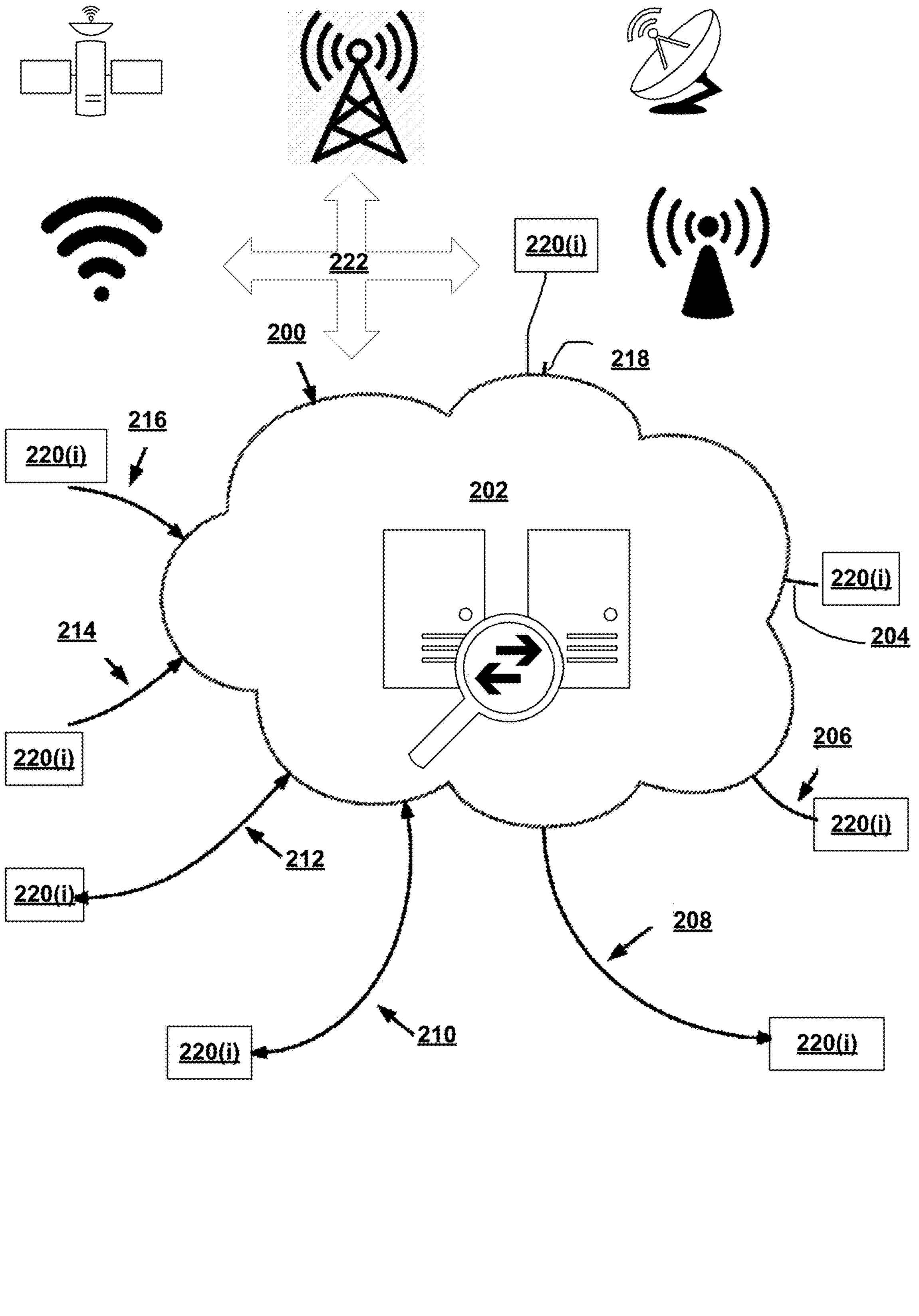
FIG. 2 is a schematic illustrating an exemplary networked environment in which a plurality of real world wagerers use respective virtual reality headsets, such as are shown in FIGS. 1A-1C, where each places a real world wager with a real world booking entity on a possible outcome in a virtual reality game of skill, of chance, or of a combination of skill and chance, which virtual reality game is hosted, enabled, and operated on one or more networked server devices, to allow the real world wagerer to participate as a spectator and/or wagerer in the virtual reality game, and to optionally interact with other such wagerers and/or spectators in the virtual reality game.
Figure 3:
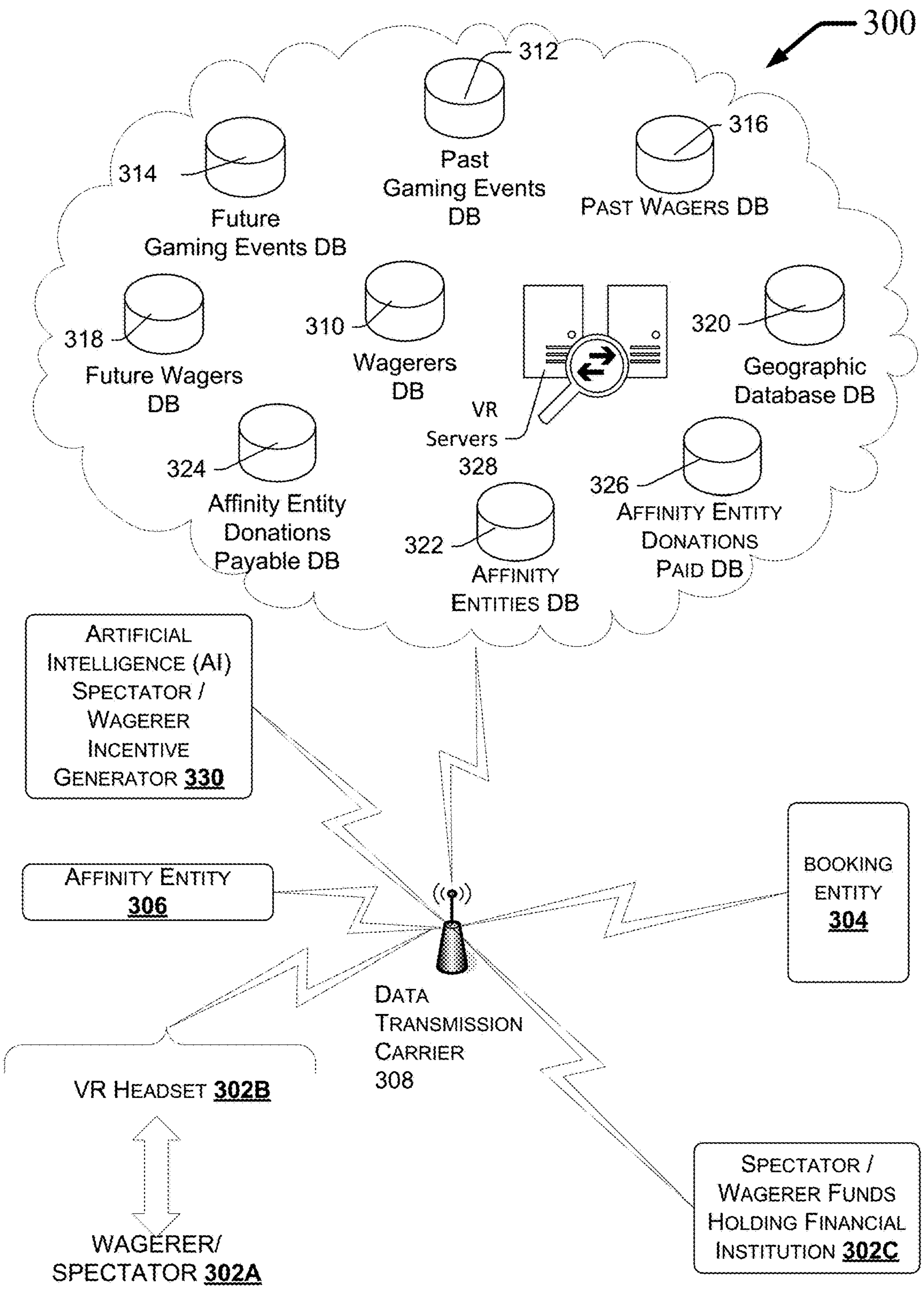
FIG. 3 is a schematic illustrating an exemplary networked environment in which a real world wagerer uses a virtual reality headset, as shown in FIGS. 1A-1C, to place a real world wager with a real world booking entity on a possible outcome in a virtual reality game of skill of chance, or of a combination of skill and chance, such as is shown in FIG. 2, and if the possible outcome actually occurs such that the real world wagerer wins the real world wager, and if the possible outcome actually occurred at a time when the probability of the possible outcome actually occurring as set by the real world booking entity did not exceed a predetermined winning odds threshold, then the real world booking entity make a real world donation to a real world affinity entity selected by the real world wagerer, and optionally where a real world spectator can pay an access fee to the real world booking entity to watch the virtual reality game without having to place a wager as a wagerer on the virtual reality game.
Figure 4:
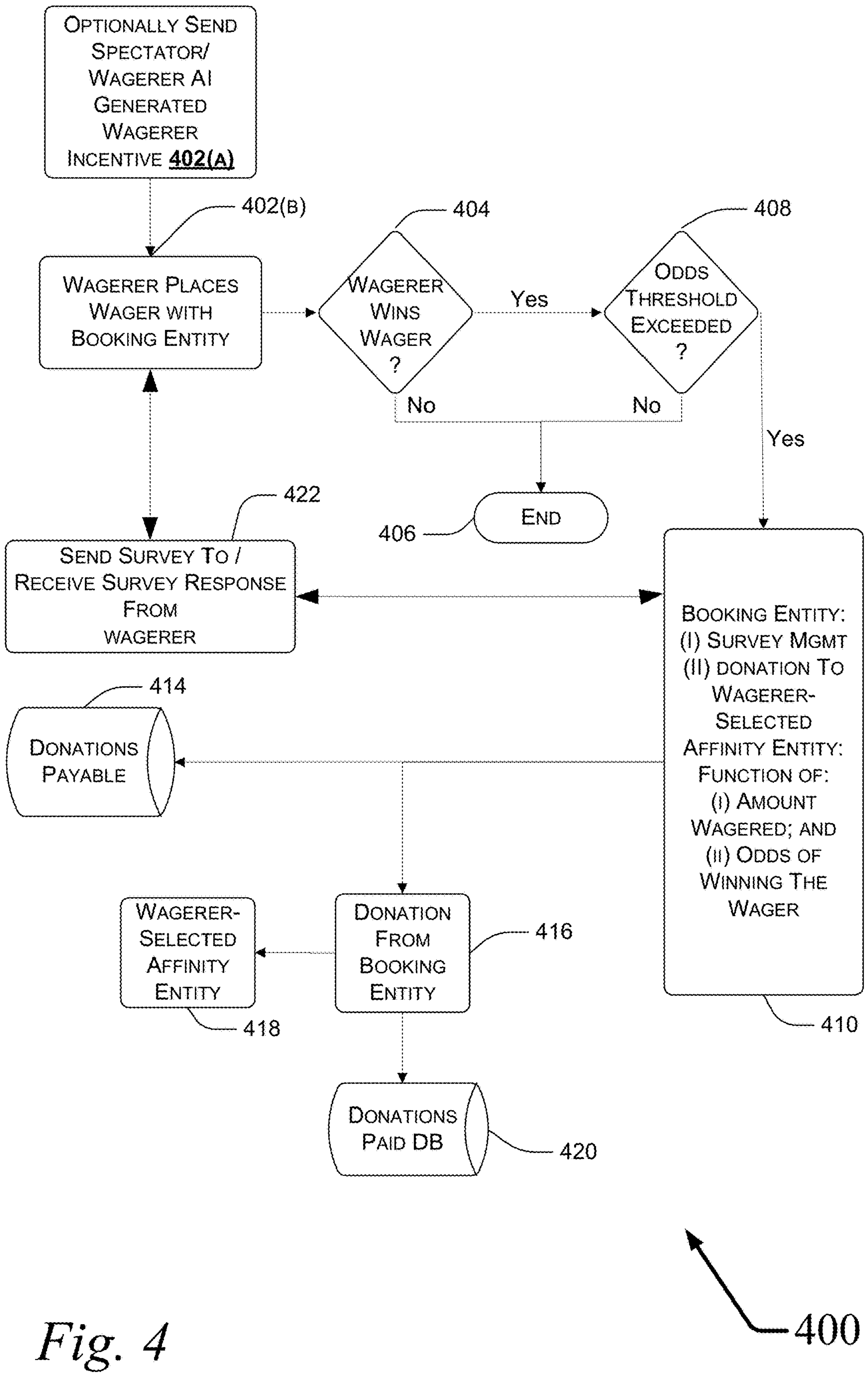
FIG. 4 is a flowchart illustrating an exemplary process, which can be performed in the environments of FIGS. 2-3, that allows a real world wagerer to place a real world wager with a real world booking entity on a possible outcome in a virtual reality game of skill, of chance, or of a combination of skill and chance, and if the possible outcome actually occurs such that the real world wagerer wins the real world wager, and if the possible outcome actually occurred at a time when the probability of the possible outcome actually occurring as set by the real world booking entity did not exceed a predetermined winning odds threshold, then the real world booking entity makes a real world donation to a real world affinity entity selected by the real world wagerer, and optionally where a real world spectator can pay an access fee to the real world booking entity to watch the virtual reality game without having to place a wager as a wagerer on the virtual reality game.
Figure 5A:
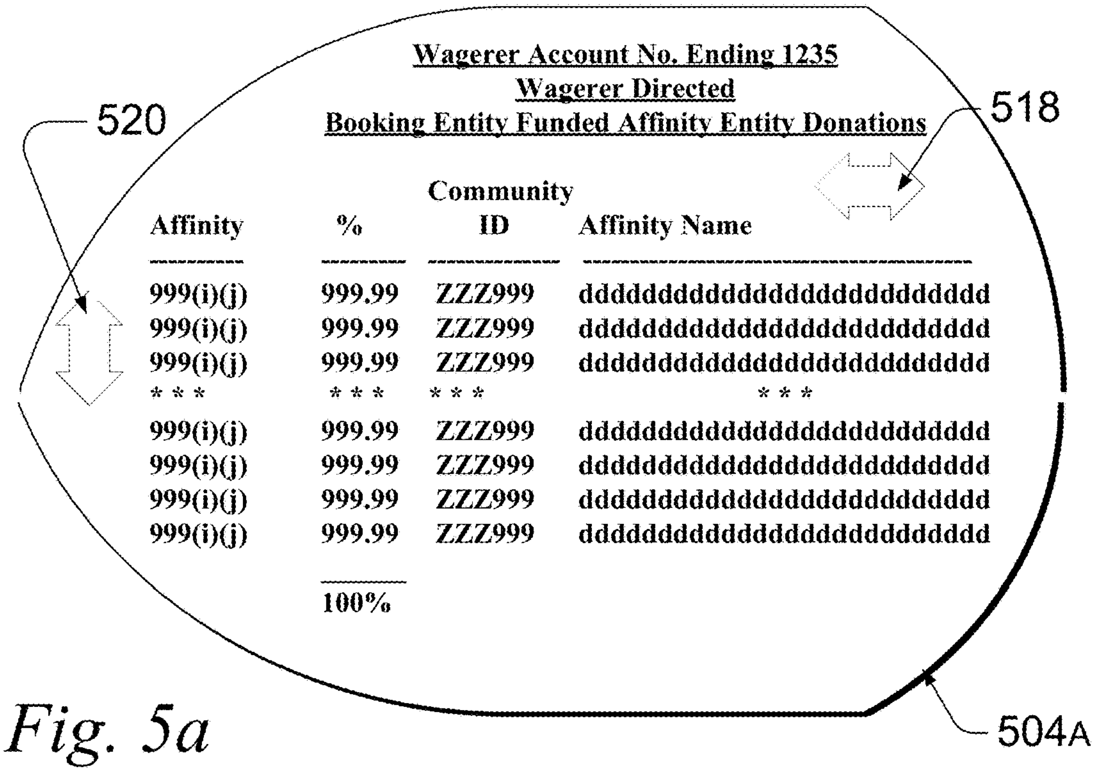
Figure 6A:
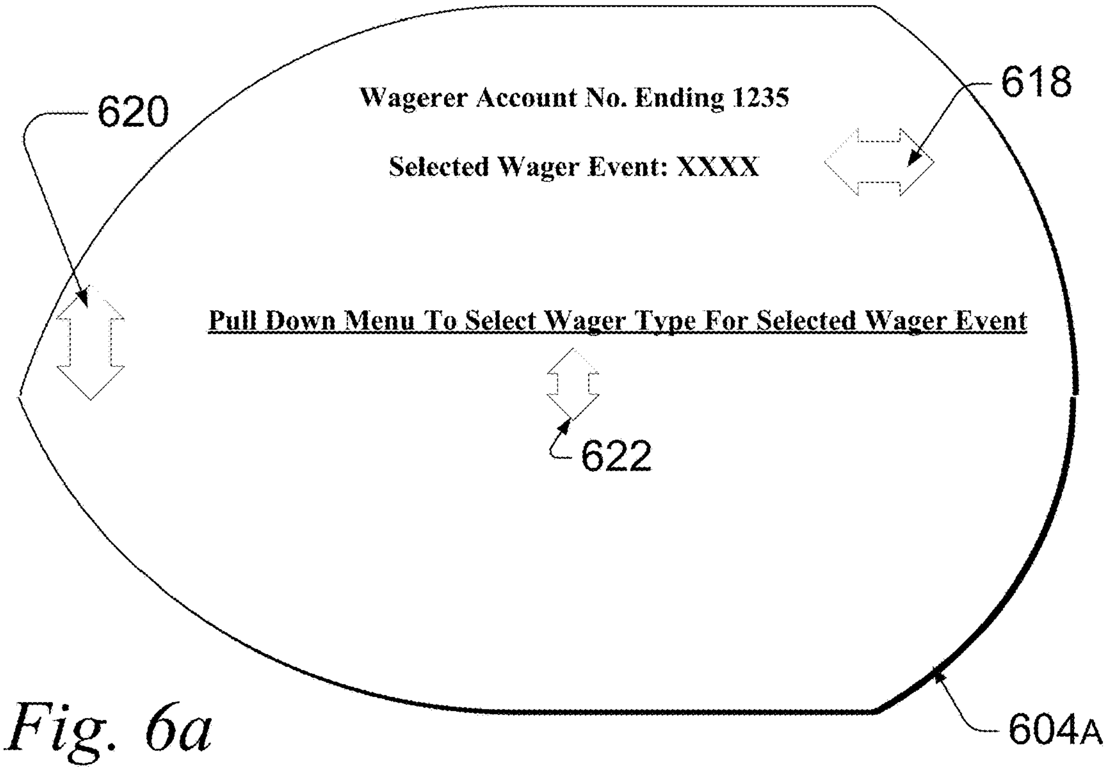
Figure 6B:
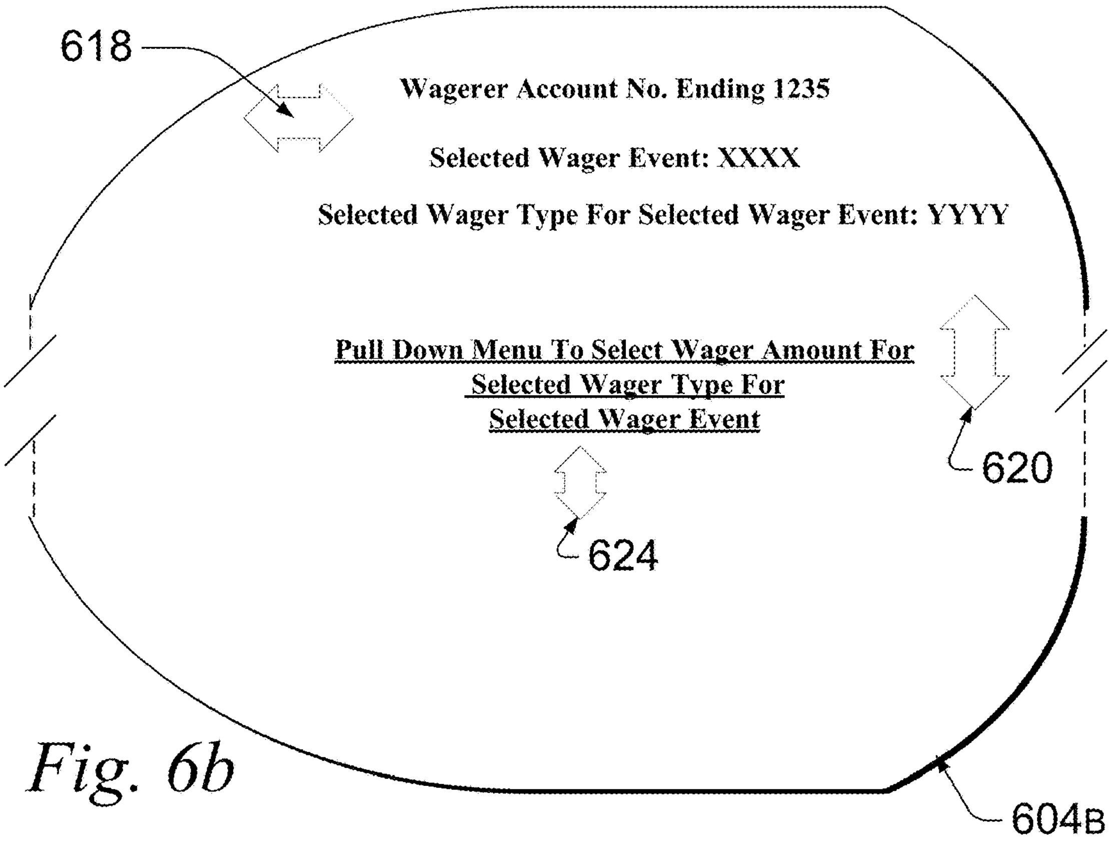
Figure 7A:
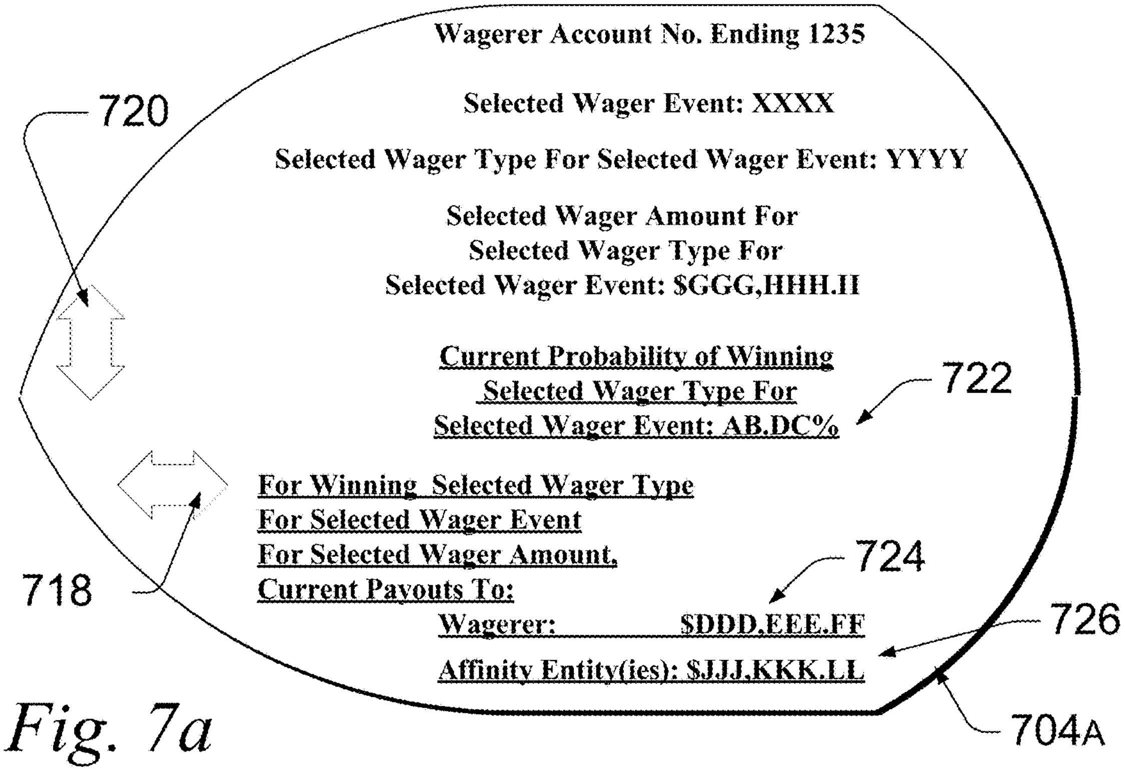
Figure 7B:
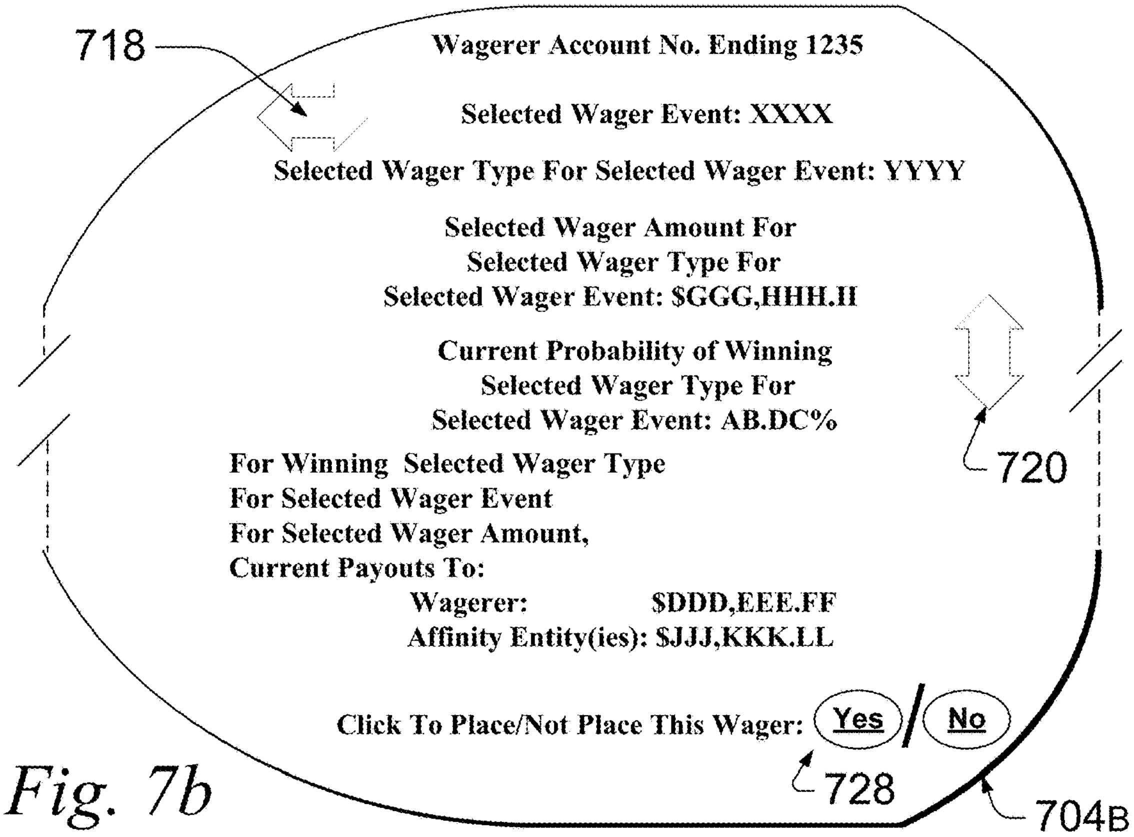
Figure 8:
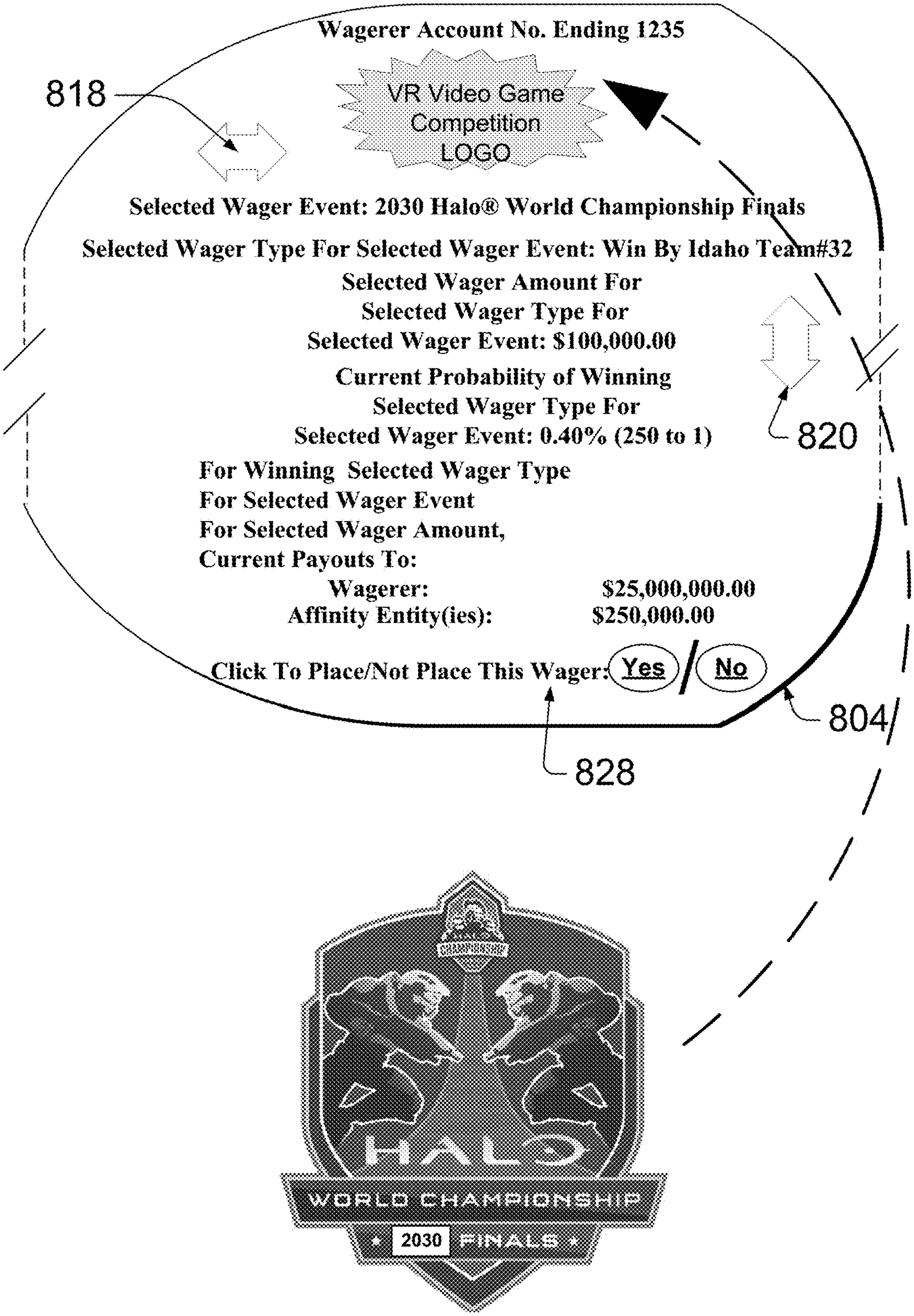

FIG. **5*a* illustrates a screen shot characterizing an exemplary user interface, such as may be rendered on any virtual reality headset as shown in FIGS. 1A-1C, for a real world wagerer to input to the virtual reality headset in order to designate one or more real world affinity entities to whom real world donations by a real world booking entity are to be made incident to the process of FIG. 4**, where when the possible outcome actually occurs such that the real world wagerer wins the real world bet, then the real world booking entity makes a real world donation to the one or more real world affinity entities designed by the real world wagerer, and optionally where a real world spectator who has paid an access fee to the real world booking entity can designate one or more real world affinity entities to whom real world donations by a real world booking entity are to be made upon the spectator's payment of the access fee to the real world booking entity;

FIGS. **5*b*-7*b* illustrate respective screen shots characterizing successive exemplary user interfaces, such as may be rendered on any virtual reality headset as shown in FIGS. 1A-1C, by which real world spectators and real world wagerers are enabled to respectively watch and place real world wagers with the real world booking entities on virtual reality competitions in computer-generated environments emulating real world competitions, such as may be incident to the process of FIG. 4**, where when the possible outcome actually occurs such that the real world wagerer wins the real world bet, then the real world booking entity makes a real world donation to the real world affinity entity(ies) selected by the real world wagerer;

FIG. 8 illustrates a screen shot characterizing a user interface, such as may be rendered on any virtual reality headset as shown in FIGS. 1A-1C, by which a real world wagerer can place a real world wager with a real world booking entity by clicking on a "YES" icon to initiate the process of FIG. 4 by which, when the possible outcome actually occurs such that the real world wagerer wins the real world bet, then the real world booking entity makes a real world payout for the winning wager to the real world wagerer and also makes the displayed donation to the real world affinity entity(ies) selected by the real world wagerer; and FIGS. 9-13 are flowcharts of respective exemplary processes according to implementations described herein, each of which can be performed in the environments of FIGS. 2-3, that allows a real world wagerer to place a real world wager, which real world wager can be placed using the user interfaces such as are seen in FIGS. 5*b*-7*b*, where the real world wager is placed with a real world booking entity on a possible outcome in a virtual reality game of skill, of chance, or of a combination of skill and chance, and if the possible outcome actually occurs such that the real world wagerer wins the real world wager, and if the possible outcome actually occurred at a time when the probability of the possible outcome actually occurring as set by the real world booking entity did not exceed a predetermined winning odds threshold, then the real world booking entity makes a real world donation to one or more real world affinity entities that will be, or that already had been, designated by the real world wagerer by way of a virtual realty headset, such as are shown in FIGS. 1A-1C, which renders a real world affinity entities designation user interface such as is seen in FIG. 5*a*.

Implementations will become more apparent from the detailed description set forth below when taken in conjunction with the drawings.

DETAILED DESCRIPTION

As used herein, a Virtual Reality (VR) competition is a computer-generated simulation of a three-dimensional image or environment that can be interacted within a seemingly real or physical way by a real world human using special electronic equipment, such as a VR headset which may include a helmet with a image rendering screen inside and/or gloves fitted with sensors. The real world human participates as a spectator and/or wagerer on a VR competition that uses computer technology to create a simulated environment of the VR competition which can be explored by the real world human in 360 degrees. As such, VR places the where the human inside the virtual environment to give an immersive experience of the VR competition. The virtual reality competition takes place virtually within a metaverse so as to emulate a real world competition, where the real world human wagerer is a spectator of and/or wagerer on a possible outcome of the virtual reality competition in the metaverse.

By way of example, and not by way of limitation, VR competition implementations include (i) VR team-A vs. VR team-B, where each real world competitor on each VR team in the VR competition wears a VR head set to compete in the VR competition; (ii) VR horse/dog racing, where each VR horse or VR dog competitor in the VR race has its bloodline emulated by a pseudo random number generator engine to enhance the speculative nature each VR competitor within each race of the VR competition; (iii) VR participant vs. machine, where a real world competitor wears a VR head set to compete against a computerized competitor (e.g., a VR head set wearing human plays a chess game against a computer executing a chess playing software application in a VR chess match); (iv) VR participant vs. VR participant, where each VR participant is a real world human wearing a VR head set to compete in a head-to-head confrontation, contest, or fight in a VR competition.

In variations of the foregoing implementation, preferably, non-competing real world wagerers wear VR headsets to place real world wagers on possible outcomes of the VR competition, and to view and optionally interact in real time with, the VR competition, as well as to optionally converse with other real world noncompeting wagerers via network communication capabilities of the metaverse implemented VR competition.

The real world book making entity (e.g., the house) facilitates the VR cloud experience on the metaverse, and defines and pays out each odds-dependent incentive to each real world wagerer-selected affinity entity (e.g., charity) upon the occurrence of a possible outcome of each VR competition upon which the wagerer's wager was placed with the real world book making entity. The source of funds from which the real world donor book maker makes the real world donation to the real world wagerer's selected real world affinity entity can be implemented by way of a variety of funding mechanisms.

One such funding mechanism, given here by way of example and not by way of limitation, is the 'rake'. The rake is a determined amount of: (a) real world wagers on a Virtual Reality (VR) competition wagering event placed in real time prior to the VR wagering event. Another such funding mechanism, given here by way of example and not by way of limitation, is the 'proposition bet' (prop bet, prop, novelty, or a side bet) that is made regarding the occurrence or non-occurrence during the VR competition wagering event (usually a gambling VR competition) of an event not directly affecting the VR competition wagering event's final outcome. (e.g., a real world wager on a performance of a specific competitor during the VR competition wagering event, or a real world wager that a certain situation will occur during the VR competition wagering event).

A still further funding mechanism, given here by way of example and not by way of limitation, are licensee revenues received from different VR licensees via various licensing modes that provide virtual attendance access to audience members at a VR competition wagering event, including but not limited to any of the following in any combination or alone: (a) Anonymous Mode, wherein a VR head set wearing human is an invisible observer and/or wagerer who may not have a corresponding avatar visible to other VR attendees; (b) Anonymous Mode in which real world human attendees are non-wagering, invisible VR observers of the real time VR competition wagering event who purchase VR access to audio/video captures of the real time the VR competition wagering event via VR access licenses as licensees; or (c) Public Mode in which there is an open communications channel wherein a real world VR head set wearing human is a virtual attending, spectator, and/or wagerer at a live, VR competition wagering event in real time along with both real and virtual attendees at the live VR competition wagering event; and (d) Private Mode in which there is a communications channel reserved for a real world human VR head set wearer and only others who are invited by the real world human VR head set wearer to virtually attend the live VR competition wagering event in real time.

In variations of the foregoing implementation for funding mechanisms, licensee revenues can also be received from different VR licensees via various licensing modes that provide virtual attendance access to audience members at a VR spectator event that is not necessarily a competition wagering event, for example, a performance art event such as a music concert, a ballet, a stand-up comedy event, a magician performance, an educational lecture, etc. In such implementations, before, during, or even after a VR spectator has provided payment for, and gained virtual access to, the real world performance art event, the VR spectator can place a wager on an unrelated live VR competition wagering event in real time in such cases where the performance art event is taking place is real time chronologically proximal to the live VR competition wagering event upon which the wager is placed. As such, the VR spectator can place wagers before, during, or after participating as a virtual spectator of the performance art event taking place is real time. As such, the booking entity can incent the virtual spectator to place such a wager on the live VR competition wagering event in real time by way of a commitment to make a defined donation, as defined elsewhere herein, to one or more affinity entities selected by the VR spectator, as defined elsewhere herein.

In each the foregoing licensing modes (a) through (d): (i) a real world human VR headset wearer can place a real world wager and then virtually attend the real time VR competition wagering event via a purchase of VR access to audio/video captures of the real time VR competition wagering event via VR access licenses as a gaming participant licensee; (ii) a VR head set wearer can virtually interact, by talking and listening, with other each other VR head set wearers respectively via a head set microphone and head set left and right earphone speakers; and (iii) each VR attendee, who is not enabled to be within an anonymous mode, has a corresponding avatar that is visible to other VR attendees who also have corresponding avatars.

Referring now to FIGS. 1A-1C, exemplary virtual reality (VR) VR headsets 100, 110 and 120 are shown, each being designed to provide an immersive experience for VR competition wagering events. Real world humans wear VR headsets to place real world wagers on possible outcomes of a VR competition wagering event, and to view and interact in real time with, the VR competition wagering event, as well as to optionally converse with other real world spectators and/or wagerers via network communication capability of the metaverse implemented VR competition. Each VR headset 100, 110 and 120 includes earphones 104 and microphone 106 to respectively listen to audio renderings emanating both from the VR competition and the respective microphones 106 of other human spectators and/or human wagerers, and to speak into.

Each VR headset 100, 110 and 120 also includes a blinder 102 to occlude the peripheral vision of the real world wearer. Such blinders 102 help to provide the wearer with a deep level of immersion into the virtual world. Each VR headset 100, 110 and 120, and/or the wearer thereof, may also include any of various known means for providing input to the metaverse and/or the VR competition, such as functionalities similar to those provided by a keyboard, mouse and/or game controller, which functionalities can be built into, or be devices peripherally in communication with, the VR headset.

FIGS. 1A-1C are provided as illustrative examples only of an exemplary VR headsets at reference numerals VR headsets 100, 110, 120 and 220 having several components. In some embodiments, a VR headset may include other components. However, it is not necessary that all of these generally conventional components be shown in order to disclose an illustrative embodiment. Each VR headset may include a central processing unit in data communication with memory. The central processing unit is an electronic circuit designed to carry out instructions of a computer program, e.g. obtained from memory, by performing the basic arithmetic, logical, control and input/output (I/O) operations specified by the program's instructions. The central processing unit may have multiple processor cores. A multi-core processor is a single computing component with two or more independent data processing units (called "cores"), which are the units that read and execute program instructions. Multiple cores can process multiple instructions at the same time, increasing overall speed for applications amenable to parallel computing, such as virtual reality applications.

The memory generally comprises some or all of random access memory (RAM), read-only memory (ROM), and/or a permanent mass storage device, such as a disk drive, flash memory, or the like. The VR headset may also include a network interface for connecting to a network and a graphics processing unit. The graphics processing unit is an electronic circuit designed to rapidly manipulate and alter electronic data to accelerate the creation of images in a frame buffer intended for output to a display. The graphics processing unit may be in data communication with a VR output display device (or an output port for connecting to an external virtual reality display device such as VR output display device(s)). In some embodiments, a speaker and a VR output display device may be integrated into a single hardware device.

Memory of an exemplary client capture device may store program code, executable by the central processing unit, corresponding to an operating system, as well as program code corresponding to a virtual reality application and other software applications.

A virtual reality application and other software applications, as well as various data files, may be loaded into the memory via network interface or via a computer readable storage medium, such as a hard-disk drive, a solid-state drive, an optical disc, a removable memory card, and/or the like.

In operation, an operating system manages the hardware and software resources of the VR headset and provides common services and memory allocation for various software applications, such as a virtual reality application. To enable software applications, such as the virtual reality application to interact with various hardware components of VR headset, such as network communications via a network interface, obtaining input data via virtual reality input device(s), rendering output data via VR output display device and/or speaker, an operating system may provide a variety application program interfaces (APIs), such a graphics API.

The virtual reality application may be delivered to the VR headset via a network communication capability and may include a program, such as a VR gambling competition game or a 2-D or 3-D video game, and a graphics engine. Instructions of the program may be executed by a central processing unit and may call various functions of the graphics engine in order to render visual data generated by the program. The functions of the graphics engine may be executed by the central processing unit and/or the graphics processing unit.

Although an exemplary VR headset has been described, a client gaming device may be any of a great number of computing devices capable of executing program code, such as the program code corresponding to operating system and virtual reality application and rendering the visual data generated by virtual reality application. By way of example, and not by way of limitation, VR headsets that can be used in various implementations disclosed herein, both in whole and in part, include: Oculus Rift, HTC Vive, Samsung's Gear VR, Zeiss VR One, Homido VR headset, Gear VR, LG 360 VR One, and Google Cardboard.

In an alternative implementation of the VR headset, the VR headset may include a monitoring device for monitoring gaming information provided by a remote source, a mechanism for selecting a wager in response to the information provided by the remote source, the mechanism generating wager information identifying the wager specifics in response to user input, means for choosing an amount to be wagered; means for combining the wager information and the amount to be wagered, and an authorization device for transmitting the wager information to a remote destination.

In another alternative implementation of the VR headset, the VR headset may include an input interface; an output interface; and game-logic circuitry configured to: connect, via the respective input and output interfaces, first and second VR headsets to an online interactive application that presents a multi-player wagering game played in a VR environment; initiate the wagering game in response to an input indicative of a wager; and direct the second VR headset to display the play of the wagering game in the VR environment.

In the foregoing implementation, the online interactive application may include: an input interface configured to receive data from an input device; an output interface configured to transmit data to a virtual reality (VR) headset; and processing circuitry configured to: transmit, to the VR headset via the output interface, a data stream defining a VR environment; direct the VR headset to display visual imagery depicting the VR environment seen from a first viewpoint including a first betting interface, the first betting interface including one or more wager characteristics enabled in the first viewpoint; receive, from a player wearing the VR headset and via the input interface, an input indicative of a selection of a second viewpoint, the second viewpoint being different from the first viewpoint; and direct the VR headset to display visual imagery depicting a VR environment seen from the second viewpoint including a second betting interface, the second betting interface including one or more different wager characteristics enabled in the second viewpoint.

In one alternative of the foregoing, the first viewpoint is from a first position at a sporting event and the first betting interface includes wagers on the outcome of the sporting event, wherein the second viewpoint is of a player in the sporting event and the second betting interface includes wagers on one of an occurrence or an outcome of a particular incident during the sporting event, and wherein the input device is the VR headset.

In another alternative of the foregoing, the first viewpoint is from a spectator seat at a sporting event and the first betting interface includes wagers on the outcome of the sporting event, and wherein the second viewpoint is of a participant in the sporting event and the second betting interface includes wagers on one of an occurrence or an outcome of a particular incident during the sporting event.

FIG. 2 shows a schematic diagram of a network configuration 200 for practicing implementations of the present invention. One or more VR headsets 220(*i*) may be connected to one or more a VR competition wagering event servers 202 through different types of network communication links 222. Each VR headset 220(*i*) may be worn and operated by a real world human such that each human is an observing game spectator, wagerer, VR competition competitor, and/or broadcaster who streams or commentates on the VR competition wagering event playthroughs for VR broadcasting over the one or more VR competition wagering event servers 202. Communication links 222 may be wireless or wired, and may employ technologies and protocols comprising Bluetooth, Wi-Fi, Ethernet technology, Local Area network (LAN), Wide Area Network (WAN), an optical network, satellite communication capabilities, and the like.

There are various implementations of VR competition wagering events that can be performed on network configuration 200 in FIG. 2. Several such implementations are now provided by way of example and not by way of limitation. In one such implementation, a first human wearing VR headset 202(*a*) may compete against a second human wearing VR headset 202(*b*) in a VR competition wagering event during which one or more other humans respectively wearing VR headsets 202(*c*-*i*) in order to participate as an observing game spectator, wagerer, and/or broadcaster who streams or commentates on the VR competition wagering event playthroughs for VR broadcasting over the one or more VR competition wagering event servers 202. By way of example, the first human wearing VR headset 202(*a*) may be a fighter having a combination of virtual physical superiority and virtual telekinesis so as to be the eventual winner of a simulated combat against the second human wearing VR headset 202(*b*) in a simulated room or hall in which judo and other martial arts are practiced (e.g., a dojo) while the other humans respectively wearing VR headsets 202(*c*-*i*) watch and place wagers on the outcome of this VR competition wagering event.

The VR competition wagering event is hosted, enabled by, and operated by a metaverse implementation by VR competition wagering event servers 202. Examples of a such a VR competition wagering event include the first human wearing a sport-type appropriately accessorized VR headset to participate as a competitor against the second human who is also wearing a sport-type correspondingly and appropriately accessorized VR headset.

The real world betting entity (e.g., the 'house') may provide an emotional incentive to place a wager. This incentive will be communicated to each VR spectator of the VR competition wagering event, where the booking entity has data showing who is likely to know or be friends with the first and/or second human competitors. To act on the incentive to place a wager, each of the one or more other humans respectively wearing VR headsets 202(*c*-*i*) will provide input to make a wager on a potential outcome of the match between the first or second human competitors. For instance, the first and second human might be amateur competitors and also friends of each other and also with the other humans respectively wearing VR headsets 202(*c*-*i*). Such friendships with the first or second human may provide a motive to accept the incentive from the booking entity to place a wager on the VR competition wagering event. It will be preferably communicated in advance to each such wagerer that score keeping for the VR competition wagering event will be facilitated by VR competition wagering event servers 202.

The VR competition wagering event in which the first human competes against the second human includes matches relating to or involving fighting with fists and/or various body limbs. These VR matches include a boxing match, a mixed martial arts match, a bar-fight, and a melee or pell-mell match simulating hand-to-hand combat at close range with little central control. Prior to and during each which such pugilistic VR competition wagering event each human spectator can use the VR headset that the human is wearing to both watch in real time the VR competition of the first human against the second human and to place a wager as to a possible outcome of the VR competition wagering event.

By way of example, and not by way of limitation, a pugilistic VR competition wagering event can be facilitated by VR competition wagering event servers, where the event is between a first contestant and second contestant that can be won by only one of the first contestant and the second contestant, where each of the first contestant and the second contestant is identified by a geographic location, where the wager placed by the wagerer designates one of the first contestant and the second contestant, and where the wager placed by the wagerer on the possible outcome of the pugilistic VR competition wagering event, said event having a plurality of rounds, can be one or a combination of: a technical knockout; a straight knockout; a disqualification for one of the first contestant and the second contestant; a time by which the competition will be decided; and a round during which the competition will be decided.

The pugilistic VR competition can be provided so as to facilitate the depiction of simulated VR combat action such as are depicted in VR games, including but not limited to: (i) The Thrill of the Fight™—VR Boxing, developed and published by Sealost Interactive LLC; (ii) Fight Night Champion™; (ii) eSports Boxing Champions™ provided through the Steel City Interactive organization; (iii) Ready 2 Rumble Boxing™ provided through the Midway Studios San Diego organization; (iv) Big Rumble Boxing™ provided through the Survios organization; (v) Gladius™ provided through the LucasArts organization; (vi) Until You Fall™ provided through the Schell Games organization; (vii) Creed: Rise to Glory™ provided through the Survios organization; (viii) Battle Talent™ developed by solo developer fonzie; (ix) Swordsman™ provided through the Perfect World Entertainment organization; (x) Blade and Sorcery: Nomad™ provided through the WarpFrog organization; (xi) Dragon Fist: VR Kung Fu™ provided through the Ben Olding Games organization; and (xii) "Drunkn Bar Fight™" as provided by and/or through The Munky LLC, having a business location at 610 9th St. Hermosa Beach, CA 90254 USA. By way of example, and not by way of limitation.

By way of example, and not by way of limitation, the companies Meta and Ultimate Fighting Championship (UFC), a mixed martial arts (MMA) events organization, provided to VR spectators, via the Ultimate Fighting Championship (UFC) Fight Pass™, a live VR MMA event by way of the Legacy Fighting Alliance (LFA) 144 event on Oct. 14, 2022, at Sanford Pentagon in Sioux Falls. S.D. The companies Meta and UFC provide to VR spectators opportunities to be admitted to spectate both live and on-demand MMA events in virtual reality through the Horizon Worlds app provided by the company Meta which is executed by Oculus devices such as the Meta Quest 2 headset.

In one implementation, there can be a bout bet on an outright winner which is a wager where the bet simply goes on one of the two human competitor to win the VR competition wagering event. By way of analogy, this wager is similar to a full-time result wager on a team in a team sport to win a team sport match or a 'win-only' wager on a particular horse to win a horse race. If the first human competitor was not favored to win the VR competition against the second human competitor, and the wager was made a One Hundred Dollars ($100.00) for the first human competitor to win the match against the second human competitor at odds set by a real world booking entity of six-to-one (6/1) for the win, then wagerer would win Six Hundred dollars ($600.00) in the unlikely event that the first human won the match against the second human. Alternatively, a wager can also be made that the match will result in a tie or draw of the first human vs. the second human where odds are set by a real world booking entity for the tie or draw. In bout betting the wagerers can also receive from the booking entity odds for a draw on the VR competitor. Score keeping during the pugilistic VR competition wagering event can be facilitated by VR competition wagering event servers 202.

In another implementation of a pugilistic VR competition wagering event, there can be a bet on a match running its full course so as to last all the way to the end of the match as assessed and facilitated by the scoring of the VR competition wagering event servers 202. Such as wager is placed by a wagerer as either bet as a 'yes' or a 'no' option. Yet another implementation of the pugilistic VR competition wagering event can be a wager as to how the first or second human will win—which wager can be on a technical knockout, a straight knockout, or disqualification for one of the two VR competitors as assessed and facilitated by the scoring of the VR competition wagering event servers 202. A still further implementation of the pugilistic VR competition wagering event can be a wager as to the time by which, or the round during which, the match will be decided. Yet another implementation is a wager that the match will end before or after a certain time or number of rounds. In this case, if a wager is placed on the match time exceeding a certain time limit or number of rounds, and the first and second human competitor are still in the match after the designated time limit or number of rounds, then the wagerer will win the wager.

VR competition wagering events other than those in which a first human competes against a second human can also be hosted, enabled by, and operated by a metaverse implementation by VR competition wagering event servers 202. Examples include a first VR team of a first plurality of VR competitors versus a second VR team of a second plurality of VR competitors. Here, each VR competitor is a human wearing a competition-type appropriately accessorized VR headset to participate as a spectator of and/or wagerer on the VR competition wagering event.

The real world betting entity (e.g., the 'house') may provide an emotional incentive to place a wager. This incentive will be communicated to each VR competitor, and to non-competitor VR spectators of the VR competition wagering event. Here it may be likely that each such wager will be placed on the team that each such spectator favors to win based on friendships with the VR competitors or based on membership of the wagerer on a particular team. Each of the one or more other humans respectively wearing VR headsets 202(*c-i*) will provide input to make a wager on a potential outcome of the match between the first and second teams. It will be preferably communicated in advance to each such wagerer that score keeping for the VR competition wagering event will be facilitated by VR competition wagering event servers 202, where each of the one or more VR headsets 220(*i*) are in communication with the one or more a VR competition wagering event servers 202.

The one or more a VR competition wagering event servers 202 will optionally implement a virtual scoreboard capable of being communicated to and rendered on each of the one or more VR headsets 220(*i*). The virtual scoreboard enables each human spectator and/or wagerer to view each other wagerer's wagers and/or wager winnings, as well as optionally each other wagerer's skill level for each VR competition wagering event.

FIG. 3 is provided as an illustrative example only, wherein there is depicted an environment 300 in which a real world spectator/wagerer 302A wears a Virtual Reality (VR) headset 302B to participate as a spectator, wagerer, and/or competitor in a VR wagering competition event conducted in real time within a metaverse. Each VR headset 302B will preferably communicate wirelessly with one or more networked VR Servers 328 that host, implement, and provide the metaverse which may be part of one or more server farms such that the real world wagerer can participate as a spectator, wagerer, and/or competitor in the VR wagering competition event, as well as to communicate via a data transmission carrier 308 with a real world booking entity 304 who determines gambling odds and receives and pays off bets on the VR wagering competition event. Alternatively, a spectator, after gaining access permission from real world booking entity 304, may also view a VR competition in real time by other means that a VR headset, such as by way of a web-enabled mobile computing device, a smart phone, a network enabled tablet, a network accessible personal computer (PC), a virtual PC, etc.

Each real world spectator/wagerer respectively funds and communicates with a real world holding financial institution 302*c*, and optionally with a real world affinity entity 306, where each of the foregoing is in communication, via data transmission carrier 308, with various network accessible resources. These network accessible resources include a wagerers data base 310 which may also contain information about spectators who may (at some point) also become wagerers, a past gaming events database 312, a future gaming events database 314, a past wagers database 316, a future wagers database 318, a geographic database 320, an affinity entities database 322, an affinity entity donations payable database 324, and an affinity entity donations paid database 326. These network accessible resources can be included in one or more one or more server farms 328 and each can be one or more of a plurality of servers.

In the environment 300, real world wagerer 302A places a real world wager (e.g., a bet) with real world booking entity 304 on a possible outcome in a VR competition of skill, a VR competition of chance, or a VR competition of a combination of skill and chance. If the possible outcome actually occurs such that real world wagerer 302A wins the real world wager, and if the possible outcome actually occurred at a time when the probability of the possible outcome actually occurring as set by real world booking entity 304 did not exceed a predetermined winning odds threshold, then real world booking entity 304 make a real world donation to real world affinity entity 306 who had been selected by the real world wagerer 302A. By way of example, and not by way of limitation, real world booking entity 304 may set the predetermined winning odds threshold at 25 percent, that is, betting odds of 4 to 1. As such, if at a time when then real world wagerer won the real world wager, the probability that the real world wagerer 302A would win the real world wager was not greater than 25 percent, that is, betting odds of 4 to 1, then real world booking entity 304 make a real world donation to real world affinity entity 306.

Booking entity 304 can define the predetermined winning odds threshold to attract or otherwise incent the wagerer to place the wager in that the wagerer will be incented by a commitment by booking entity 304 to make a donation to one or more affinity entities 306 that will be, or that have already been, selected by the wagerer. Such an incentive may assist charities and other philanthropy ventures having interests in common with the wagerer. By way of example, and not by way of limitation, each of the one or more affinity entities 306 may be: (i) a charity and other philanthropy venture in or near the community where the wagerer resides and/or has a place of business or recreation; (ii) a food bank in or near the community where the wagerer resides and/or has a place of business or recreation; (iii) a homeless shelter in or near the community where the wagerer resides and/or has a place of business or recreation; (iv) a healthcare provider in or near the community where the wagerer resides and/or has a place of business or recreation; (v) a youth sports booster organization in or near the community where the wagerer resides and/or has a place of business or recreation; (vi) a faith community organization attended by, or granting membership to, the wagerer; (vii) an entrepreneurial advice and consultation organization that assists in the startup of ventures in or near the community where the wagerer resides and/or has a place of business or recreation; (viii) etc.

As used herein, the term "community" may be defined as those locations that can be navigated to within a time period that does not exceed a predetermined travel threshold by way of a particular mode of travel (e.g., walking bicycle, automobile, lite rail, etc.) In such variations, the predetermined travel threshold can be derived using a web mapping platform using a real time traffic navigation algorithm and one or more travel modes used by the navigation algorithm. Alternatively, the term "community" may be defined as a town, city, county, state, province, zip code, or other governmental geographic identifier.

The predetermined winning odds threshold might be defined by booking entity 304 so as to best or better incent the wagerer to place a wager. By way of example, and not by way of limitation, predetermined winning odds threshold might be defined by booking entity 304 such that: (i) all winning wagers will commit booking entity 304 to make a defined donation to affinity entity 306; (ii) a majority of the winning wagers will commit booking entity 304 to make a defined donation to affinity entity 306; (iii) only a minority of the winning wagers will commit booking entity 304 to make a defined donation to affinity entity 306; (iv) only wagers exceeding a predetermined minimum wager amount will commit booking entity 304 to make a defined donation to affinity entity 306; (v) the booking entity 304 will be committed to make a defined donation to affinity entity 306 only there is an extremely small, or most unlikely, chance that the wagerer will win the wager; or (vi) some combination of the foregoing.

The time that the betting odds are set by booking entity 304 can vary, depending upon the VR competition or nature of the wager. Some VR competitions, like a VR simulated coin toss or a VR simulated roulette wheel as are enabled by pseudo random number generators, do not have changing odds (e.g., the odds of a moving simulated rolling roulette ball stopping on '32 red' on a simulated roulette will be unchanging for each such VR competition). Also, in the playing of VR casino games such as VR video roulette for example, the chances or odds of probability of a winning ball, as set by a software pseudo random number generator, will remain the same throughout the VR competition, regardless of the number of wagerers playing the VR competition or the amount of wagerer that are being wagered with booking entity 304. In contrast, some VR competitions, such as team vs. team VR competitions, do not offer the same controlled certainty as some VR casino games, so the chance (or betting odds) on a given outcome can and do change in during the time period prior to the contest or before the betting event actually starts. In virtual reality horse racing, virtual reality football, virtual reality hockey, etc. the odds are likely to change during the course of betting before each VR competition. So, the time when the possible outcome actually occurs is taken into consideration in disclosed implementations because betting odds change as new bets are received by booking entity 304, meaning that probability estimations vary with time. Moreover, the odds set by different booking entities 304 may differ from one booking entity 304 to another booking entity. So, disclosed implementations take into consideration the probability of the possible outcome actually occurring as set by booking entity 304 with whom the wager was made by the wagerer.

Wagerers data base 310 can include personas information actively provided, or passively acquired if possible, by the wagerer. Personas information in wagerers data base 310 can be used by an Artificial Intelligent (AI) wagerer incentive generator 130 to generate an incentive most likely to incent wagerer 302 to place a wager with booking entity 304, or to generate an incentive most likely to incent spectator 302 to pay for access to watch a VR competition.

By way of example, and not by way of limitation, booking entity 304 may institute and operate a loyalty program for incenting spectators and/or wagerers to respectively watch and place wagers on VR competitions, where the incentive is an agreement by the booking entity 304 to make donation to an affinity entity of the spectator's/wagerer's choice. To do so, booking entity 304 will perform data mining upon data collections regarding potential spectators and/or wagerers who, in the past, have been so incented by the booking entity's agreements to make donations to an affinity entity of the spectators' and/or wagerers' choice. The mined data is subjected to artificial intelligence algorithms the purpose of which is to identify new spectators and/or wagerers who are likely to be similarly incented. Examples of the types of data being mined include active and passively collected voice, facial recognition, and image capture data (e.g., internet-connected smart home appliance customer input-output data, internet-of-things (IOT) appliance customer input-output data, internet-connected personal digital assistants (e.g., Amazon Echo and Amazon Echo Camera data), geographic location data, social-economic demographics data, customer satisfaction survey data, customer input-output social network data, customer input-output search engine data, customer transaction data, etc.

Data mining implementations using artificial intelligence algorithms may employ many types of artificial intelligence and statistical techniques that can be used to engage in predictive modeling or data mining in the optimization of incentives. For example, there are several methods including, but not limited to, neural networks, decision trees, CHAID, CART, fuzzy logic, chaos theory, and other more traditional statistical methods, such as linear regression.

As to wagerers, the AI generated incentive may be a particularly higher donation made to affinity entity 306 when the wagerer wins a wager placed with booking entity than donations made by booking entities that compete with affinity entity 306 for wagers by the wagerer. AI wagerer incentive generator 130 may generate the incentive by using data accessed, obtained, and/or derived from wagerers database 310, past gaming events database 312, future gaming events database 314, past wagers database 316, future wagers database 318, geographic database 320, affinity entities database 322, affinity entity donations payable database 324, and/or affinity entity donations paid database 326.

Past gaming events database 312 includes information gleaned by booking entity 304 from past gaming events. Future gaming events database 314 includes information stored by booking entity 304 for use in determining odds for future gaming events, and information gleaned by booking entity 304 from past wagers placed with booking entity 304 by one or more wagerers 302A for which the result of the game upon which a wager was placed has not yet been determined because the game or wager event has not yet finished or is still ongoing. Past wagers database 316 includes information gleaned by booking entity 304 from past wagers placed with booking entity 304 by one or more wagerers 302A. Geographic database 320 includes geographic addresses of one or more affinity entities in affinity entities database 322, geographic addresses of one or more wagerers 302A in wagerers database 310, and other relevant geographic addresses which can be used to incent the wagerer to place a wager with booking entity 304. Affinity entities database 322 includes information gleaned by booking entity 304 for each of one or more affinity entities in affinity entities database 322. Affinity entity donations payable database 324 includes information gleaned by booking entity 304 from gaming events that resulted in a donation (e.g., a donation that has not yet been made) to be made by booking entity 304 to one or more affinity entities in affinity entities database 322. Affinity entity donations paid database 326 includes information gleaned by booking entity 304 from gaming events that resulted in a donation having been made by booking entity 304 to one or more affinity entities in affinity entities database 322.

With respect to the incentive sent by the booking entity to the spectator, the incentive can be a booking entity defined donation that will be made to a spectator-identified affinity entity, such as the spectator's favorite charity. The donation incentive, by way of example and not by way of limitation, can be a donation by the booking entity of a percentage of a currency amount paid by the spectator to have online access to and watch a virtual reality competition in a computer-generated environment emulating a real world competition. The spectator may pay for such access by way of funding deposited into a spectator and/or wager account with the booking entity, where the spectator uses any known funding mechanism. These funding mechanisms include but are not limited to a payment to booking entity issued spectator and/or wager account with from the spectator's credit account, debit account, checking or saving accounts. Alternatively, the spectator's payment to the booking entity issued spectator and/or wager account may be by way of an interbank settlement of a payment by the spectator such as a settlement of an interbank obligation for a third party bank which settlement is facilitated by an electronic transfer of funds among financial institutions where such financial institutions respectively represent the spectator and the booking entity. Alternatively, the spectator's payment to the booking entity issued spectator and/or wager account may be by way of a real time payment including but not limited to the Federal Reserve Service FedNow™, Zelle®, Venmo®, PayPal®, etc. as disclosed and enabled by systems and methods in U.S. patent application Ser. No. 17/687,621, titled "Donation Incented Real Time Payment".

By way of example, and not by way of limitation, as shown in FIG. 3, network accessible databases, including wagerers data base 310 which includes personas information provided by the spectator and the wagerer, contain information can be accessed, obtained, and used to make derivations employed by an AI Spectator/Wagerer Incentive Generator 330 to generate an incentive most likely to incent spectator 302 to pay to booking entity 304 for access to watch a VR competition, and/or to incent wagerer 302 to place a wager with booking entity 304. This AI generated incentive may be, for instance, a donation by booking entity 304 to an affinity entity 306 selected by spectator 302 when spectator 302 pays for such access. Alternatively, this AI generated incentive may be, for instance, a particularly higher donation made to affinity entity 306 when the wagerer wins a wager placed with booking entity. AI wagerer incentive generator 130 may generate the incentive by accessing, obtaining, and making derivations using data accessed from wagerers database 310, past gaming events database 312, future gaming events database 314, past wagers database 316, future wagers database 318, geographic database 320, affinity entities database 322, affinity entity donations payable database 324, and/or affinity entity donations paid database 326. Data pertaining to a Wagerer-Selected Affinity Entity can be accessed and retrieved, by way of example, by way of network access to one or more of affinity entities database 322, affinity entity donations payable database 324, and affinity entity donations paid database 326.

An exemplary process 400 shown in FIG. 4 allows a real world booking entity to incent both real world spectators and real world wagerers to respectively watch and place real world wagers with the real world booking entity on virtual reality competitions in computer-generated environments emulating real world competitions. At step 402A, an optional step allow both the real world spectator and the real world wagerer to be sent an Artificial Intelligence (AI) generated spectating and/or wagerer incentive 402(*a*) to incent the spectator and/or wagerer to watch and/or place a bet with the booking entity.

A step 402B of Process 400, the wagerer places a wager with the booking entity. If the wagerer does not win the wager as determined by the query at step 404, the process 400 terminates at step 406. Otherwise, a query is made at step 404 whether the odds threshold of the wagerer winning the wager was exceeded when the wager was won. As previously disclosed herein relative to the "predetermined winning odds", the odds threshold is defined by the booking entity to incent the wagerer to place a wager. The booking entity can define the predetermined winning odds threshold, or the odds threshold of the wagerer winning the wager, to attract or otherwise incent wagerer to place the wager in that wagerer will be incented by a commitment by booking entity to make a donation to one or more affinity entities that will be, or that have already been, selected by the wagerer. Such an incentive may assist charities and other philanthropy ventures having interests in common with the wagerer. By way of example, and not by way of limitation, each of the one or more affinity entities selected by the wagerer may be: (i) a charity and other philanthropy venture in or near the community where the wagerer resides; (ii) a food bank in or near the community where the wagerer resides; (iii) a homeless shelter in or near the community where the wagerer resides; (iv) a healthcare provider in or near the community where the wagerer resides; (v) a youth sports booster organization in or near the community where the wagerer resides; (vi) a faith community organization attended by, or granting membership to, the wagerer; (vii) an entrepreneurial advice and consultation organization that assists in the startup of ventures in or near the community where the wagerer resides; (viii) etc.

The "predetermined winning odds", also referred to herein as "the odds threshold" might be defined by the booking entity 304 so as to best or better incent the wagerer to place a wager. By way of example, and not by way of limitation, the odds threshold might be defined by the booking entity such that: (i) all winning wagers will commit the booking entity to make a defined donation to the affinity entity(ies) selected by the wagerer; (ii) a majority of the winning wagers will commit the booking entity to make a defined donation to the affinity entity(ies) selected by the wagerer; (iii) only a minority of the winning wagers will commit the booking entity to make a defined donation to the affinity entity(ies) selected by the wagerer; (iv) only wagers exceeding a predetermined minimum wager amount will commit the booking entity to make a defined donation to the affinity entity(ies) selected by the wagerer; (v) the booking entity will be committed to make a defined donation to the affinity entity(ies) selected by the wagerer only if there is an extremely small, or most unlikely, chance that the wagerer will win the wager; or (vi) some combination of the foregoing.

If the odds threshold, or the predetermined winning odds was exceeded, then process 400 terminates at step 406. Otherwise, process 400 performs steps 410, 416, 418, and 422, where donations payable at step 414 correspond, by way of example, to affinity entity donations payable database 324 seen in FIG. 3, and donations paid at step 420 correspond, by way of example, to affinity entity donations paid database 326 seen in FIG. 3.

At step 422 of process 400, the booking entity may send a survey to the wagerer from whom the booking entity will receive back a survey response. The survey response may include the wagerer's response to various surveyed questions, which questions, for example, ask about the wagerer's experience as a spectator or with the wager process, the degree to which one or more incentives offered by the booking entity to the wagerer incented the wagerer to place the wager, the degree to which the type and kind of donation by the booking entity incented the wagerer to place the wager with the booking entity, what changes might be made to even further incent the wagerer to place future wagers with the booking entity, etc. The survey responses may be inputted into one or more of the network accessible databases, such as are shown in FIG. 3, which responses can be made available for future use by AI Spectator/Wagerer Incentive Generator 330.

The donation made by the booking entity to the affinity entity(ies) selected by the wagerer will preferably be derived from the amount of the wager and the betting odds at the time when the wager was won by the wager. By way of example, and not by way of limitation, the donation may be larger for larger wagers, and the donation may be larger when the betting odds of the wagerer winning the wager are small as opposed to the betting odds being favorable to the wagerer winning the wager. As such, the wagerer may be incentivized to place the wager, albeit with less than favorable betting odds, because the wagerer is incented to place the wager due to the booking entity's commitment to make a larger donation to the wagerer's selected affinity entity when the betting odds are not favorable to the wagerer.

When the wagerer places a wager on a possible outcome in a game of skill, a game of chance, or a game of a combination of skill and chance, and if the possible outcome actually occurs such that the wagerer wins the bet, and if the possible outcome actually occurred at a time when the probability of the possible outcome actually occurring as set by the booking entity did not exceed a predetermined winning odds threshold, then, as shown at step 410 of process 400, the booking entity makes a donation to an affinity entity selected by the wagerer.

Referring now to FIG. 5*a*, a screen shot 504A features input and displays fields by which a spectator and/or a wagerer has a wagerer account number ending in "12345" by which the spectator and/or wagerer, or agent thereof, can direct a booking entity to make a donation to one or more affinity entities designated by the spectator and/or wagerer, as shown in FIG. 5*a*.

With respect to the spectator, the booking entity is the entity with whom the spectator has deposited funding into an account held by the book entity, which funding is a payment for an access license to watch a virtual reality competition in a computer-generated environment emulating a real world competition. The deposit of funding by the spectator can be in response to an incentive offered to the spectator by the booking entity, where the incentive is a donation to the spectator's designed affinity entity(ies). The donation paid out by the book entity for such funding by the spectator will be made under terms and conditions, under various implementations disclosed herein, as are defined by the booking entity. As such, the incentive can be a booking entity defined donation that will be made to a spectator-identified affinity entity, such as the spectator's favorite charity. The donation incentive, by way of example and not by way of limitation, can be a donation by the booking entity of a percentage of a currency amount paid by the spectator to have online access to and watch a virtual reality competition in a computer-generated environment emulating a real world competition. The spectator may pay for such access by way of funding a spectator and/or wager account with the booking entity, where the spectator uses any known funding mechanism including but not limited to a payment to booking entity issued spectator and/or wager account with from the spectator's credit account, debit account, checking or saving accounts. Alternatively, the spectator's payment to the booking entity issued spectator and/or wager account may be by way of a real time payment including but not limited to the Federal Reserve Service FedNow™, Zelle®, Venmo®, PayPal®, etc.

With respect to the wagerer, the booking entity is the entity with whom a wager has been placed by the wagerer. The donation will be made under terms and conditions, under various implementations disclosed herein, as are defined by the booking entity.

The fields provided by screen shot 504A allow the spectator and/or wagerer to specify one or more affinity entities, which may be geographically located in their local community, to which donations are to be made by the booking entity with whom the spectator received access to view a VR competition, and/or with whom the wagerer places a wager. In such implementations, the booking entity may be given notice of its total periodic donations. Such notice, however, can optionally be given without providing the booking entity with any notice or knowledge as to the specific identity of those affinity entities that are to be the recipients of its donations. The donation mechanism can be set up such that the booking entity makes blind donations, either directly or indirectly, to affinity entities in the local community of the spectator and/or wagerer who selects those local community affinity entities. Accordingly, the donation mechanism may leave direction of the booking entity's donations fully within the discretion of the spectator and/or wagerer, limited only, for example and not limitation, by the restriction that the spectator and/or wagerer can only select from among those affinity entities that serve the local community where the spectator and/or wagerer resides, works, or both, while leaving the actual amount of the booking entity's donation fully within the discretion of the booking entity.

Optionally, a further limitation on those local community affinity entities that may be selected by the spectator and/or wagerer may include control logic that accesses a rating, and/or that derives a rating, for an affinity entity. The control logic may use one or more ratings given by one or more charity rating organizations, where the control logic result is used to determine whether or not the affinity entity is eligible for participation in the implementation as a registered affinity entity that is selectable by the spectators and/or wagerer. The ratings may be retrieved via access to one or more network accessible databases where such ratings are input and maintained. Example of charity rating organizations which provide one or more ratings that could be used for various disclosed implementations include a rating database that contains information as to whether a donation to a particular affinity entity can be treated as a tax deduction, Guide Star, Charity Navigator, Give Well, Evangelical Council for Financial Accountability (ECFA), the Better Business Bureau Wise Giving Alliance Standards for Charity Accountability of the Council of Better Business Bureaus, Inc., and the like that now exist or may exist in the further. Moreover, other mechanisms for assessing local community affinity entities may be used to determine whether or not affinity entities are eligible for participation in the disclosed implementations as registered affinity entities that are selectable by spectators and/or wagerers.

Each row in screen shot 504A of FIG. 5*a* may represent a different Affinity Entity in the local community of the wagerer for which there is a specific code (e.g., 999(i)(j), Community Identifier (e.g., ZZZ999), and Affinity Name as shown in FIG. 5*a*. A pull down menu of selectable affinity entities (not shown) can be used to provide selectable input to the fields corresponding to affinity entities shown on screen shot 504A.

By way of example, the Affinity Entity and/or the Community ID might identify a specific Affinity Entity that is located in, and provide goods and services to, the borough of Greenwich Village at the southern portion of the geographical island of Manhattan in the city of New York of the State of New York, in the USA. By way of example, and not by way of limitation, the Affinity Entity Code 105(064) (q2e) could have an interpretation where '105' represents the United States of America, the index '064' represents the state of New York, "q" represents the City of New York, "2" represents the combined boroughs of Manhattan, and "e" represents the borough of Greenwich Village at the southern portion of the geographical island of Manhattan in the city of New York of the State of New York. The name of the specific Affinity Entity represented the code 105(064) (q2e) can be the Washington Square Food Bank, which may be located in, and philanthropically provide goods and services to, the borough of Greenwich Village at the southern portion of the geographical island of Manhattan in the city of New York of the State of New York, in the USA.

Note that the spectator and/or wagerer can provide input or edits to data shown on screen shot 504A to specify multiple community IDs each representing a geographic location where the spectator and/or wagerer has a residence, operates a business, or recreates in the geographic location.

Also note that, for each such community ID specified by the spectator and/or wagerer, the second column of the rows of screen shot 504A in FIG. 5*a* may add up to 100%, thereby providing a percentage of the donation to be made by the booking entity with whom the spectator gained access from the booking entity to view a VR competition, and/or the wagerer placed a wager on a VR competition.

In alternative implementation, the spectator and/or wagerer can select an affinity entity to whom the booking entity is to make a donation, where the affinity entity is a 'smart contract' having various spectator and/or wagerer designated terms and conditions. In such implementations, the 'smart contract' can be for the donation by the booking entity to be used to make a purchase for a particular good or service, where the donation is facilitated by the smart contract having an Internet computer protocol operating so as to digitally facilitate the performance of the donation according to terms and conditions of the smart contract. The smart contract implementations herein are similar to the smart contact methodologies as disclosed in U.S. patent application Ser. No. 16/466,728, titled "Blockchain Tracking And Managing Of A Transaction Incented By A Merchant Donation To A Consumer Affinity".

In a further variation, booking entity 304 may select one, some, or all of affinity entity(ies) 306 that are to receive donations from booking entity 304 based upon wagers placed by the wagerer (e.g., St. Jude Children's Research Hospital). In a yet further variation, booking entity 304 may require the wagerer 302A to select one or more specific affinity entities 306 as some or all of the spectator's and/or wagerer's selected affinity entities 306.

In FIGS. 5*a*-8, reference numerals ending in 18 and 20 represent icons on the respective user interfaces by which a user of the user interface can cause the display on the user interface to be shifted, respectively, horizontally, and vertically to view previously unseen portions of a rendered display.

Figure 5B:
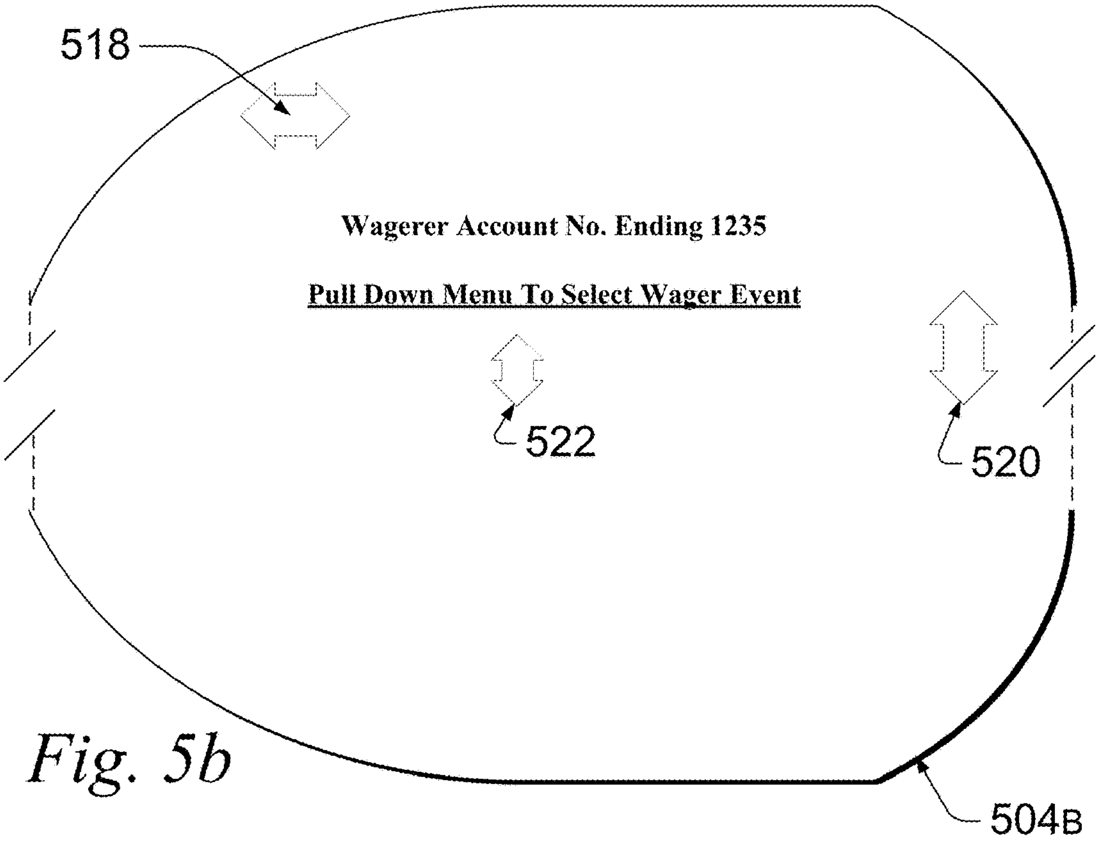

Referring now to FIG. 5*b*, screen shot 504B allows a user acting for the wagerer account number ending in 12345 to use a pull down menu to display a list of wager events from which the user can make a selection of a particular wager event on which to place a wager.

Alternatively, screen shot 504B in FIG. 5*b* can also allow a user acting for a spectator account number ending in 12345 to use the pull down menu to display a list of VR competitive events from which the user can make a selection in order to gain access from a booking entity to view any selected VR competitive event. In such cases, the booking entity from whom such access is given to the spectator may have been incented the spectator by a promise by the booking entity to make a donation to the spectator's designated affinity entity, where the donation is a predetermined amount or a percentage of the funding deposited by the spectator into spectator account number ending in 12345 that was issued to the spectator by the booking entity, and where such funding was also to secure such access to watch the VR competition by the spectator. In each such case, the donation incentive is defined by the booking entity and the affinity entity(ies) is/are selected by the spectator. Access to watch the VR competition by the spectator may be, by way of example and not by way of limitation, by wearing a VR headset such as are shown in FIGS. 1A-1C, by way of a web-enabled mobile computing device, a smart phone, a network enabled tablet, a network accessible personal computer (PC), a virtual PC, etc.

Referring now to FIG. 6*a*, screen shot 604A allows a user acting for the wagerer account number ending in 12345 to use a pull down menu to display a list of wager types for the wager event selected by use of screenshot 504B in FIG. 5*b*, and from which the user can make a selection of a particular wager type for the wager event selected by use of screenshot 504B in FIG. 5*b* wager event. By way of example, and not by way of limitation, selectable wager types include team and/or competitor wagers, proposition bets, a wager that a VR competition will result in a tie or draw, a wager that a VR competition will run its full course so as to last all the way to the end of the VR competition, a wager as to the way that one of the VR competitors wins the VR competition, the time that, or time period during which, one of the VR competitors will win the VR competition, etc.

Referring now to FIG. 6*b*, screen shot 604B allows a user acting for the wagerer account number ending in 12345 to use a pull down menu to display and select a wager amount from a list of wager amounts for the selected wager type for the selected wager event selected by use of screenshots 504B and 604A in FIGS. 5*b* and 6*a*, respectively.

Referring now to FIG. 7*a*, screen shot 704A allows a user acting for the wagerer account number ending in 12345 to see an offer or incentive from the booking entity to place the wager for the wager amounts for the selected wager type for the selected wager event selected by use of screenshots 504B, 604A, and 604B in FIGS. 5*b*-7*a*, respectively. The offer or incentive from the booking entity will include the current probability of winning the selected Wager Type For the Selected Wager Event. As shown in FIG. 7*a*, the current probability can be a probability expressed as a percentage of a successful outcome of the wager, e.g., AB.DC %. The offer or incentive from the booking entity will also include a commitment from the booking entity if the wagerer wins the wagerer for the selected wager amount for the selected wager type for the selected wager event, where the commitment includes a payout amount, set at the betting odds at the current time, and where the payout is shown for the wagerer, and an amount of a donation by the booking entity to the affinity(ies) that have been, or that will be, selected by the wagerer. Note that, at the time when the wagerer is actually won, the betting odds at that time may be different, which difference may in turn change one or both amounts of the payout and the donation as defined by the booking entity.

Referring now to FIG. 7*b*, screen shot 704B allows a user acting for the wagerer account number ending in 12345 to click on a "YES" icon and thereby place the wager and thereby receive the commitment from the booking entity as shown in FIG. 7*a* at screen shot 704A. If, however, the user clicks on a "NO" icon, the wager is not placed and the commitment from the booking entity is not made as shown in FIG. 7*a* at screen shot 704A. With the placement of the wager, access, retrieval, and updates are made to one or more networks accessible databases 310-322 and with wagerer funds holding financial institution 302*c* shown in FIG. 3 from which funds for the wagerer's wager are obtained. When the wagerer places a wager, wagerer funds holding financial institution 302*c* can be adjusted as if a transaction were conducted to fund a wager with a personal payment account of the wagerer, which is any form of payment (e.g., funds derived from a debit or credit account issuer by an issuer to the wagerer, a real time payment from a wagerer's account, etc.) For example, the wagerer, upon placement of the wager, may incur a promissory charging liability that is received by a credit card issuing bank.

By way of example, and not by way of limitation, a VR competitive event upon which wagers can be placed is the Halo® video game, and particularly the Halo Infinite video game. The Halo Infinite video game is a science fiction, first-person shooter (FPS) game involving skill, chance, and a combination of skill and chance. Competitors in the Halo Infinite video game wear VR headsets while applying both strategy and video game playing skills that may include the use of shooting virtual firearms, grappling hooks, light vehicles, and jet propelled aircraft. Combat in this VR video game requires competitors to use various arms such as beam guns while taking cover behind virtual defensive barricades. Competitors make choices including role-based characters, transportation, and video game modes. Wagers can be places on various outcomes of Halo competitions, including which Halo competitive team secures a first flag, has the most competitor kills per match, and estimated Halo video game length prior to termination of the game. Competitors can be high level professionals that compete in professional Halo Infinite matches. As such, each such a professional Halo Infinite match can provide wagerers with a fair match on where to place a wager as well equitably fair pay outs on odds that are made by a booking entity on the outcome of the professional Halo Infinite match. In such cases, a professional Halo Infinite match will have an advantage over less predictable amateur Halo Infinite matches. Moreover, non-competitor spectators are incented to be observers and place wagers on a professional Halo Infinite match due to the attention-attracting nature of game play that includes an arsenal of tactics and armory employed by skilled professional video game competitors, and which VR competition is commentator-friendly so as to give spectators the desire to be live viewers (e.g., using VR helmets) during the competition played by the video game professionals.

Professional Halo matches can have an extensive professional match circuit of VR video game events each of which involves a first-person shooter game in a futuristic science fiction setting that features multiple maps and game modes in which competitor can find weapons and upgrades that spawn in predetermined positions around the map. The matches can be played in a best-of-three or best-of-five format, meaning that Halo competitor teams can both pick and ban maps from a set map pool, until there are three or five left, and then the team that wins the majority first wins a series of games in the match. Every map also has a set number of possible game modes, with the two teams playing just one of those game modes.

One such game mode is "Capture The Flag" where each team has a set location for their flag on a map and they must travel across the map, take the enemy flag and bring it back to that team's flag. Another game mode is "Strongholds" where there are a plurality of areas on the map known as control points. Players can capture control points by virtually 'standing' in them for a few seconds and if a team controls at least some a of a maximum number of such control points, then that team win competitor points. Yet another game mode is "Oddball", where players fight over control of a skull, which is known as the ball. If a player is virtually 'holding' the ball, that player's team wins competitor points and a team wins a round once that team wins a predetermined number of competitor points.

Wagers on a Halo Infinite VR competition can vary from betting on a match winner, spreads, totals, and futures on most of the games. One such wager is a bet placed on a team that the wagerer believes is going to win a particular match. Other options may be to bet on the number of kills throughout a Halo Infinite VR competition tournament or which a Halo Infinite VR competitor will strike the first kill. The bookmaking entity will determine the types of betting that are available as well as the odds as the time approaches the beginning of the Halo Infinite VR competition tournament.

By way of example, a VR spectator of a Halo Infinite professional VR competition can place a wager on a professional team that will win a series of matches and the end result of the series, where the Halo Infinite series is played in a best-of-three or best-of-five format. Additionally, a wager can be placed by a spectator on an individual map in the Halo Infinite series. With all Halo Infinite matches being played over multiple maps, a wager can be placed on a spread when the wagerer wants to have a variety of betting choices. Spreads, also known as handicaps, can alter the starting score of a Halo Infinite match.

A spectator who places a wager on 'totals' in Halo Infinite will make a choice as to how many games will be played in a series so that the wagerer does not choose a specific team in a match. As such, a 'Total Wager" is represented by OVER or UNDER, as to signify a choice of whether a match will have more or fewer maps. In the case of a professional Halo Infinite competition, an option like OVER 2.5 would suggest that three maps will be played in a series, while UNDER 2.5 would signify only two maps will be played. As a yet further wagering option, a "Futures" wager is a wager that is only open before an event starts and allow a wagerer to choose the overall winner of the professional Halo Infinite competition. Still as a yet another wagering option, a 'Prop Bet", also known as a proposition bet, is a wager that is based on certain events in the game that may not even affect the outcome of the match, such as "Map Winner", "Map Spreads", and "Special Weapon Kills".

Referring now to FIG. 8, screen shot 804 shows an example of a user acting for the wagerer account number ending in 12345 to see and accept an offer or incentive from a booking entity to place a wager for a wager amount of One Hundred Thousand Dollars ($100,000.00 US) on a particular VR competitive event, namely the 2030 professional Halo World Championship Finals. This video game takes place in a fictional metaverse as a first-person shooter game being played in virtual reality, and the title competition will result in one (1) winning team that plays the competition during the 2030 calendar year. The winning team is decided by score keeping for this VR video game competition that may be facilitated, in whole or in part, by a networked group of VR competition wagering event servers.

As shown in FIG. 8, a spectator places a wager for the virtual player team called Idaho Team #32 to be the winner of the 2030 Halo World Championship Finals video game competition in a spread bet wager. The booking entity, at present, has set the spread bet wager for the betting odds to win this wager at four tenths of one percent (0.40%). That is, betting odds of 250-to-1 are presently set against the virtual player team called Idaho Team #32 to be the winner of the 2030 Halo World Championship Finals video game. For these betting odds, the booking entity will payout the wagerer's win at a payout set such that for every one dollar ($1.00) that is bet, there will be a payout of Two Hundred Fifty Dollars ($250 US). As such, if the wagerer places this bet, the booking entity, at least at the present odds, has agreed to payout winnings of Twenty Five Million Dollars ($25,000.000.00 US) to the wagerer. As an additional part of the incentive to place the wager, the booking entity will make a commitment to pay one percent (1%) of the payout as a donation to the affinity entity(ies) selected by the wagerer. As such, the incentive of a donation of Two Hundred Fifty Thousand Dollars ($250,000.00 US) to the affinity entity(ies) selected by the wagerer is presented in the illustrated display screen rendering for the wagerer's consideration. Note that, at the time when the wagerer actually wins the wager, the betting odds at that time may be different than the time at which the "YES" icon is clicked by the user, which difference may in turn change one or both of the payout to the wagerer and the donation by the booking entity to the affinity entity(ies) selected by the wagerer. Preferably, prior to the wagerer placing the wager with the booking entity, the payout and the donation will have predetermined business rules under the control of, that is, defined by, the booking entity, which predetermined business rules are both seen and agreed to by the wagerer.

FIGS. 9-13 shown respective processes 900-1300 each of which can be performed in environment 300 of FIG. 3. In process 900 in FIG. 9, a query is made at step 902 as to whether a wagerer has placed a bet with a booking entity (e.g., makes a wager with the house) on a possible outcome in a game of skill, a game of chance, or a game of a combination of skill and chance. If not then process 900 terminates at step 990. Otherwise, process 900 includes a step 903 for an option, when a predetermined winning odds threshold is exceeded, under which the booking entity takes out loss prevention insurance policy to pay off if the possible outcome actually occurs such that the wagerer wins the bet. Note that the booking entity may opt to take out a loss prevention insurance policy in the unlikely event (low probability or low betting odds) that the wagerer will win a large amount on the wager. This insurance may be desirable in that the betting entity may be obligated to: (i) make bigger donations for bigger odds against the wagerer winning the wager; and/or (ii) make bigger donations for smaller loses (e.g., the wagerer came very close to winning his wager which win was extremely improbable, that is, the odds against the wagerer winning were exceptionally large and for very close losses the booking entity has agreed to make a donation to the wagerer's affinity entity(ies).

Figure 9:
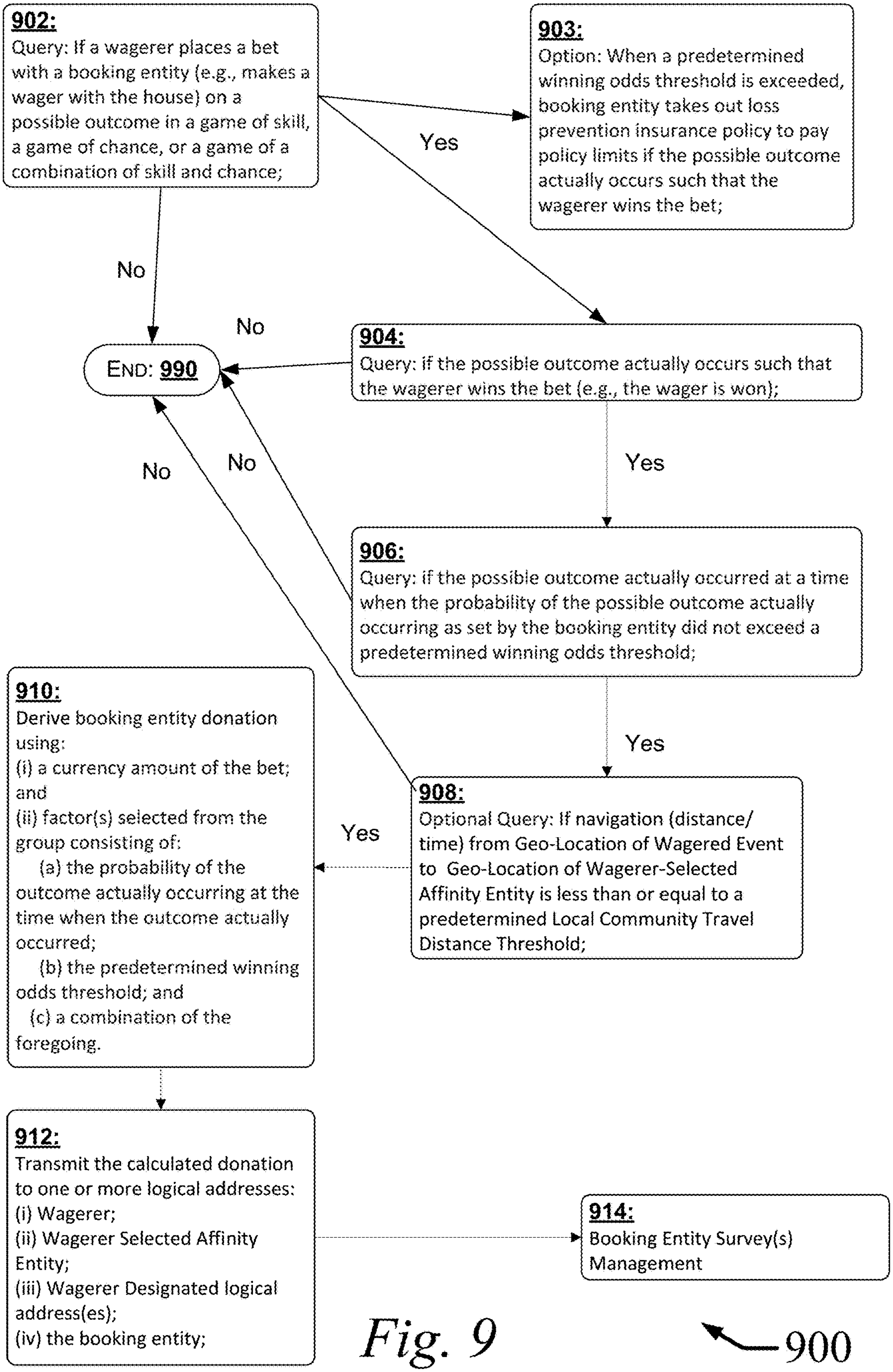

In process 900 in FIG. 9, a query is made at step 904 as to whether the possible outcome actually occurs such that the wagerer wins the bet (e.g., the wager is won). If not then process 900 terminates at step 990. Otherwise, process 900 moves to step 906 at which a query is made as to whether the possible outcome actually occurred at a time when the probability of the possible outcome actually occurring as set by the booking entity did not exceed a predetermined winning odds threshold. If not then process 900 terminates at step 990. Otherwise, an optional inquiry is made at step 908 as to whether the navigation (distance/time) from a Geo-Location of the Wagered Event corresponds to the Geo-Location of Wagerer-Selected Affinity Entity. This optional query determines if the distance/time to navigate therebetween is less than or equal to a predetermined Local Community Travel Distance Threshold. This option may be taken if, by way of example and not by way of limitation, the booking entity is willing to make donations for winning wagers only when the affinity entity is located in the same town, community, city, county, state, province, etc. as a geographic location corresponding to the event upon which the wager was placed.

The process conducted at optional step 908 may employ various implementations and variations thereof. For instance a navigation algorithm, using any of various different travel methods (e.g., walking, automobile, bicycle, mass transit, etc.), may be used to determine whether the time, using one or more travel methods, is within a predetermined time limit to ascertain whether or not the predetermined Local Community Travel Distance Threshold has been satisfied (e.g., the donation by the booking entity is to be made to an affinity entity close to the geographic location corresponding to the event upon which the wager was placed.)

By way of example, the affinity entity selected by the wagerer might be determined to be within the same local community if the automobile drive time, as determined from one or more databases of contemporary cartographic road system information, to navigate to the affinity entity is less than a predetermined time threshold (e.g., 17 minutes), and where the estimated automobile drive time takes real time traffic data, both past and present, into consideration.

A further alternative implementation may identify the population density of the geographic location corresponding to the event upon which the wager was placed. If the population density exceeds a predetermined density, then the affinity entity selected by the wagerer might be determined to be within the same local community if the time to walk, bicycle or take public transportation to the affinity entity from the geographic location corresponding to the event upon which the wager was placed, as determined from one or more databases of contemporary topographic, mass transit, and/or pedestrian cartographic system information, is less than a predetermined time threshold (e.g., 55 minutes).

Still another such comparison can be whether the geographic location corresponding to the event upon which the wager was placed and that of the selected affinity entity are proximate according to voting, electoral, or political districts. The district use can be determined by an official method, an unofficial method, or a combination of method. By way of example, measurements known within the political gerrymander sciences can be used, including but not limited to a minimum district to convex polygon ratio, shortest split line algorithm, minimum isoperimetric quotient, etc.

The local community corresponding to the geographic location corresponding to the event upon which the wager was placed and that of each of one or more wagerer selected affinities, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owns and leased properties, etc. Given the foregoing, determinations might be made that the geographic location of the affinity entity(ies) selected by the wagerer are acceptable to the booking entity sufficient to make the donation offered as an incentive to the wager.

Similar or different techniques may be used to determine the respective local community of the geographic location corresponding to the event upon which the wager was placed and that of each of one or more wagerer selected affinities to determine there is a shared local community to whom the booking entity will make a donation.

If the local community of the geographic location corresponding to the event upon which the wager was placed and that of each of one or more wagerer selected affinities are determined to be the same, then the business rule selected by the booking entity may determine the amount of the donation that the booking entity will make to the affinity entity selected the wagerer. In some implementations, the affinity entity to whom the booking entity is to make a donation may only be selected by the wagerer and not be the booking entity. In such implementations, tensions between the goals or purpose of an affinity entity, if any, between the booking entity and the wagerer may be reduced by allowing the identity of the affinity entity to be unknown to the booking entity while being selected by the wagerer. As such, the booking entity may need not be told or be given any notice, directly or indirectly, as to the identity of the affinity, entity selected the wagerer with whom the booking entity has placed a wager. Rather, the booking entity may be told or be given notice to make the required donation as a single payment of, or period payments to, to a single affinity entity that may thereafter make respective disbursements for the booking entity accordingly to those affinity entities that had been selected by those wagerers with whom the wagerers had placed bets with the booking entities. A booking entity who, by force of reason or conscience, does not want to make a donation to a particular affinity entity need not do so directly, as any and all booking entity donations are made blindly through the single affinity entity that make all disbursements to all affinity entities. Accordingly, each booking entity may have notice of its total periodic donations without knowing the identity of the intended recipients, thereby leaving direction of donations fully within the discretion of the wagerers who place wagers with the booking entity, limited only by an optional restriction that the booking entity's donation must be made to an affinity entity serving the local community of the geographic location corresponding to the event upon which the wager was placed.

In process 900 in FIG. 9, step 910 a donation to be made by the booking entity is derived using: (i) a currency amount of the bet; and (ii) factor(s) selected from the group consisting of (a) the probability of the outcome actually occurring at the time when the outcome actually occurred (e.g., the wager is won); (b) the predetermined winning odds threshold; and (c) a combination of the foregoing.

In process 900 in FIG. 9, step 912 the donation to be made by the booking entity is transmitted to one or more logical addresses; (i) Wagerer; (ii) Wagerer Selected Affinity Entity; (iii) Wagerer Designated logical address(es); (iv) the booking entity. In such cases, the wagerer may wish that a notice be sent to supporters, friends, and/or allies of the selected affinity entity as to the forthcoming donation such that the wagerer will provide the logical address(es) for such purposes. For example, text messages, social media posts, URL website additions, instant messaging transmissions, facsimiles, online newspaper releases, and/or emails can be sent. In process 900 in FIG. 9, step 914 the booking entity may send and receive back responses from the wagerer for a survey for uses as described elsewhere herein.

Figure 10:
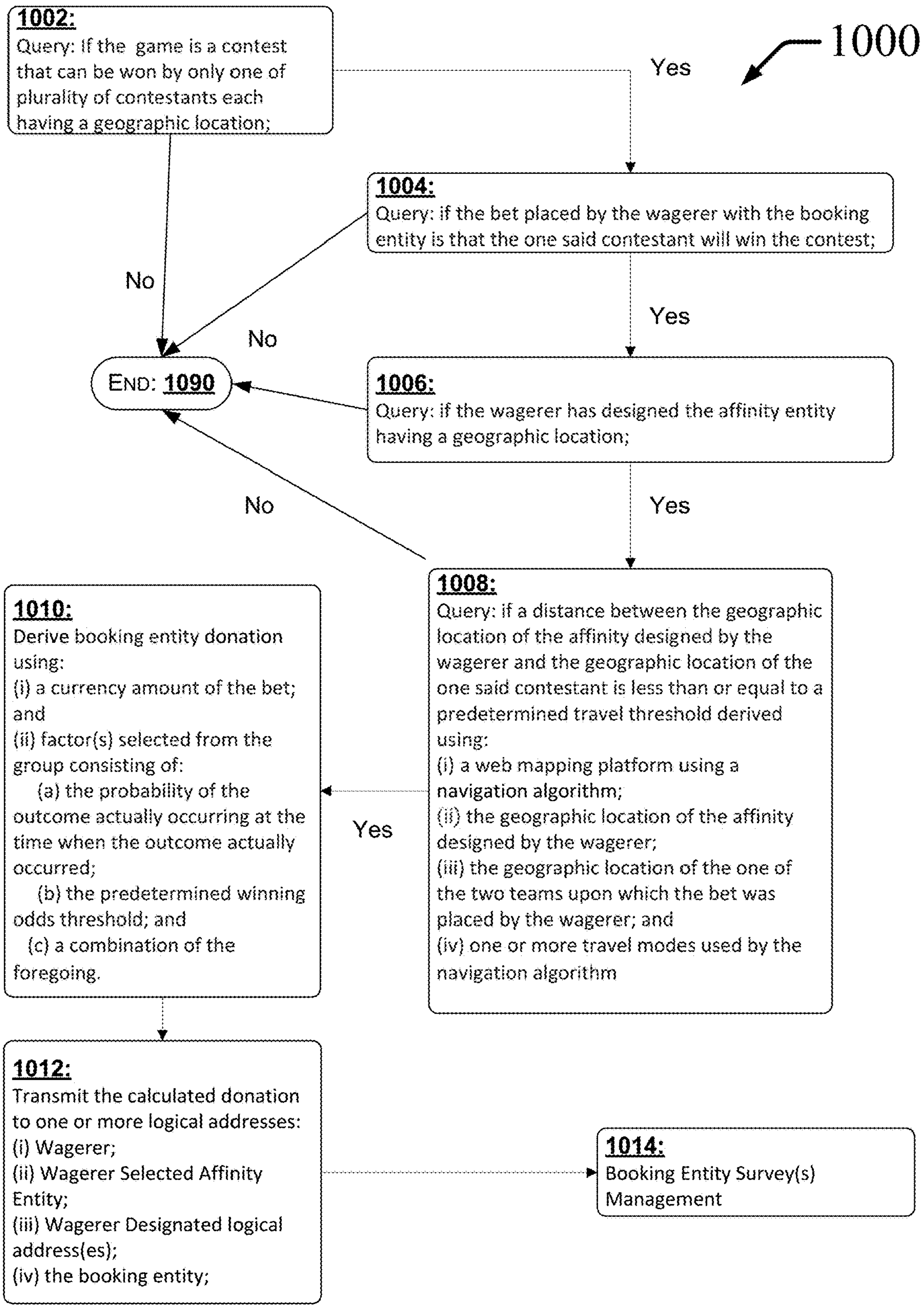

Process 1000 in FIG. 10 may follow and/or be incorporated with process 900 of FIG. 9, where a query is made at step 1002 as to whether the game is a contest that can be won by only one of plurality of contestants each having a geographic location. If not then process 1000 terminates at step 1090. Otherwise, process 1000 moves to step 1004 at which a determination is made as to whether the bet placed by the wagerer with the booking entity is that the one contestant will win the contest. If not then process 1000 terminates at step 1090. Otherwise, process 1000 moves to step 1006 at which a determination is made as to whether the wagerer has designed the affinity entity having a geographic location. If not then process 1000 terminates at step 1090. Otherwise, process 1000 moves to step 1008 at which a determination is made as to whether a distance between the geographic location of the affinity designed by the wagerer and the geographic location of the one contestant is less than or equal to a predetermined travel threshold derived using: (i) a web mapping platform using a navigation algorithm; (ii) the geographic location of the affinity designed by the wagerer; (iii) the geographic location of the one of the two teams upon which the bet was placed by the wagerer; and (iv) one or more travel modes used by the navigation algorithm. Implementation of step 1006, in numerous variations thereof, is disclosed and described elsewhere herein. If not then process 1000 terminates at step 1090. Otherwise, process 1000 moves to step 1010 at which a donation to be made by the booking entity is derived. The derivation for the donation can use: (i) a currency amount of the bet; and (ii) factor(s) including: (a) the probability of the outcome actually occurring at the time when the outcome actually occurred; (b) the predetermined winning odds threshold; and (c) a combination of the foregoing.

After step 1010 in process 800 in FIG. 10, step 1012 initiates a transmission of the donation to be made by the booking entity to one or more logical addresses; (i) the Wagerer; (ii) the Wagerer Selected Affinity Entity; (iii) the Wagerer Designated logical address(es); (iv) the booking entity. In such cases, the wagerer may wish that a notice be sent to allies of the selected affinity entity as to the forthcoming donation such that the wagerer will provide the logical address(es) for such purposes. In process 1000 in FIG. 10, step 1014 the booking entity may send and receive back responses from the wagerer for a survey for uses as described elsewhere herein.

Figure 11:
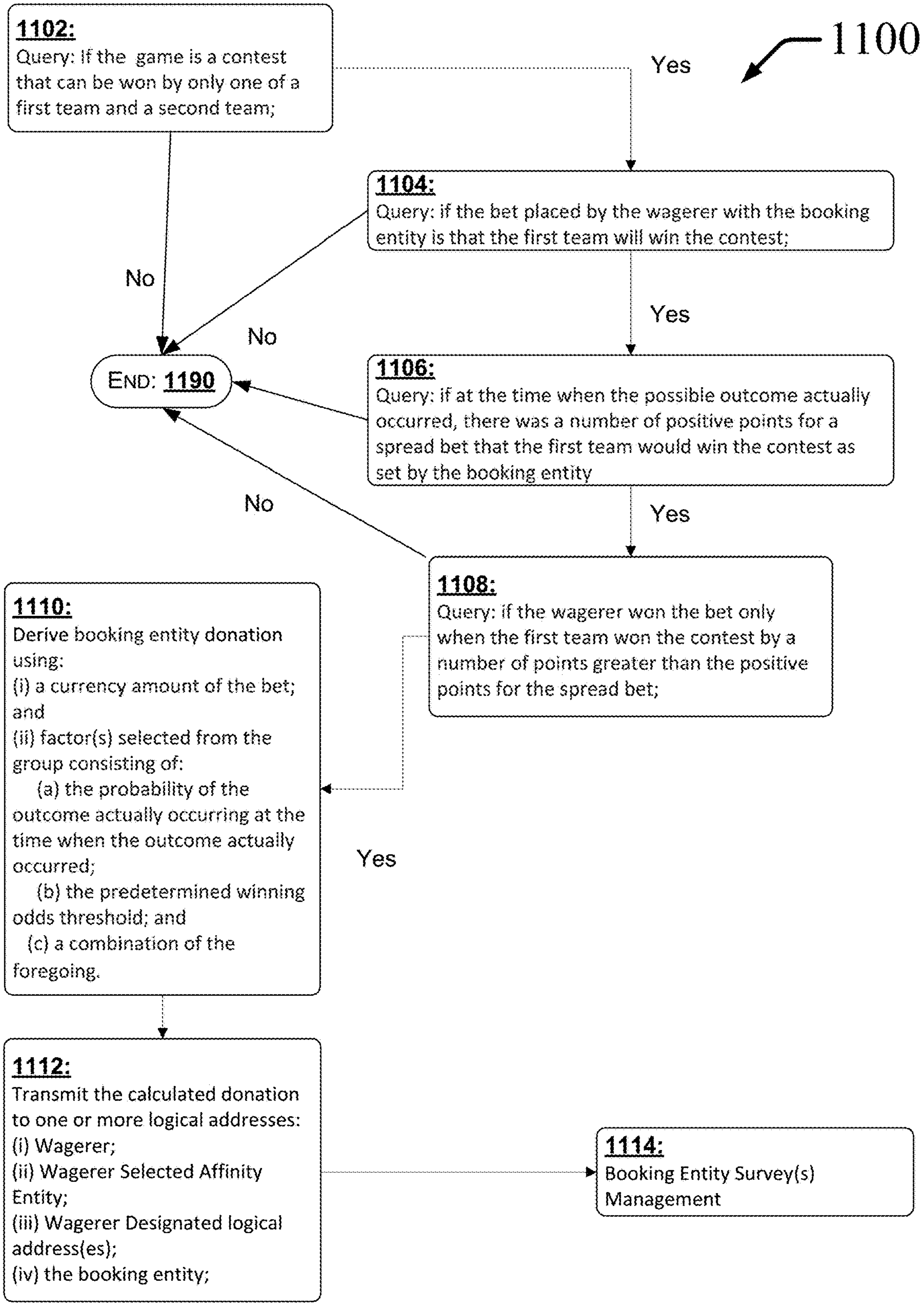

Process 1100 in FIG. 11 may follow and/or be incorporated with process 1000 of FIG. 10, where a query is made at step 1102 as to whether the game is a contest that can be won by only one of a first team and a second team. If not then process 1100 terminates at step 1190. Otherwise, process 1100 moves to step 1104 at which a determination is made as to whether the bet placed by the wagerer with the booking entity is that the first team will win the contest. If not then process 1100 terminates at step 1190. Otherwise, process 1100 moves to step 1106 at which a determination is made as to whether, if at the time when the possible outcome actually occurred, there was a number of positive points for a spread bet that the first team would win the contest as set by the booking entity. If not then process 1100 terminates at step 1190. Otherwise, process 1100 moves to step 1108 at which a determination is made as to whether the wagerer won the bet only when the first team won the contest by a number of points greater than the positive points for the spread bet. If not then process 1100 terminates at step 1190. Otherwise, process 1100 moves to step 1110 at which at which a donation to be made by the booking entity is derived. The derivation for the donation can use: (i) a currency amount of the bet; and (ii) factor(s) selected from: (a) the probability of the outcome actually occurring at the time when the outcome actually occurred; (b) the predetermined winning odds threshold; and (c) a combination of the foregoing.

After step 1110 in process 1100 in FIG. 11, step 1112 initiates a transmission of the donation to be made by the booking entity to one or more logical addresses; (i) the Wagerer; (ii) the Wagerer Selected Affinity Entity; (iii) the Wagerer Designated logical address(es); (iv) the booking entity. In such cases, the wagerer may wish that a notice be sent to allies of the selected affinity entity as to the forthcoming donation such that the wagerer will provide the logical address(es) for such purposes as discussed elsewhere herein. In process 1100 in FIG. 11, step 1114 the booking entity may send and receive back responses from the wagerer for a survey for uses as described elsewhere herein.

Figure 12:
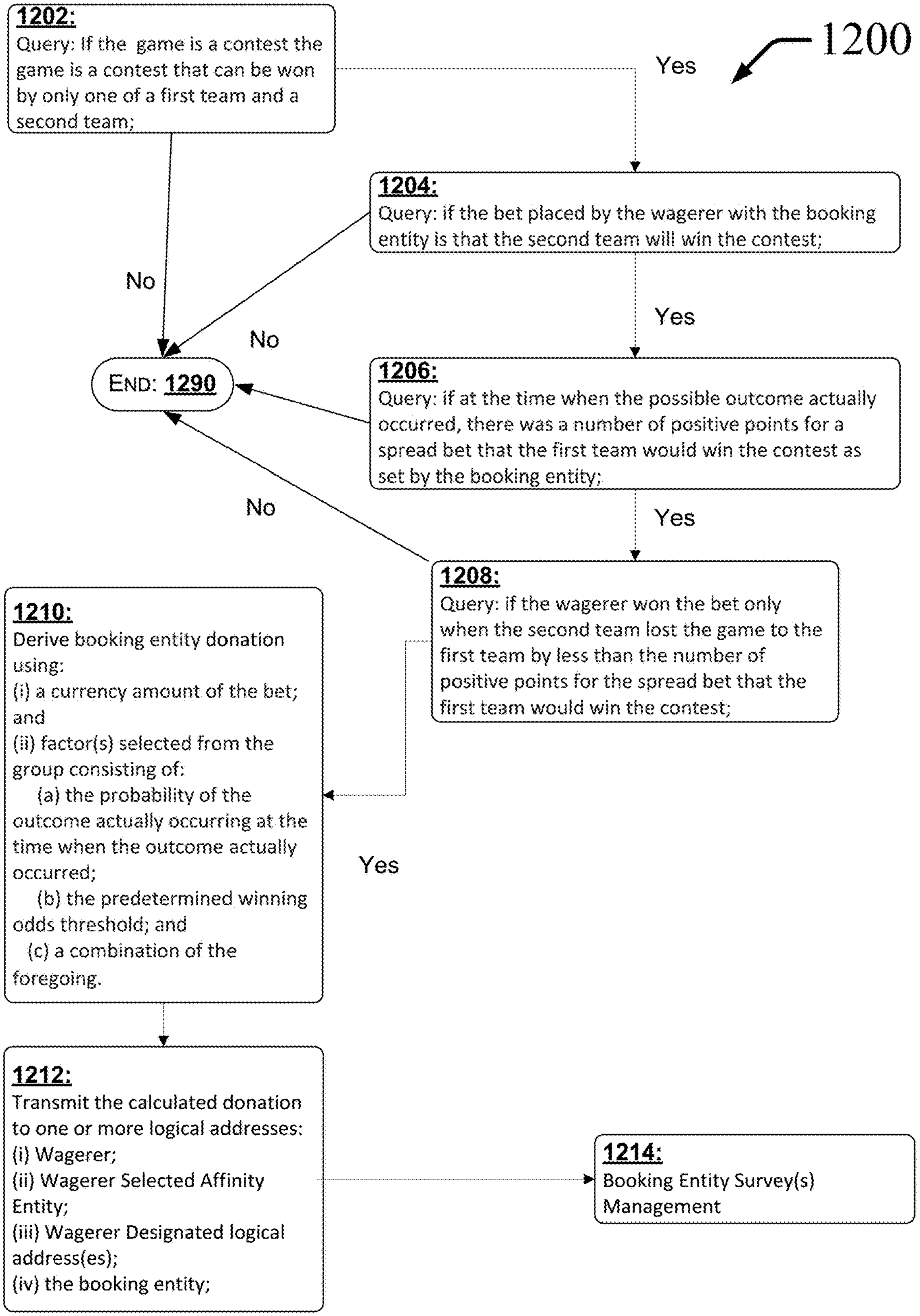

Process 1200 in FIG. 12 may follow and/or be incorporated with process 1100 of FIG. 11, where a query is made at step 1202 as to whether the game is a contest that can be won by only one of a first team and a second team. If not then process 1200 terminates at step 1290. Otherwise, process 1200 moves to step 1204 at which a determination is made as to whether the bet placed by the wagerer with the booking entity is that the second team will win the contest. If not then process 1200 terminates at step 1290. Otherwise, process 1200 moves to step 1206 at which a determination is made as to whether, if at the time when the possible outcome actually occurred, there was a number of positive points for a spread bet that the first team would win the contest as set by the booking entity. If not then process 1200 terminates at step 1290. Otherwise, process 1200 moves to step 1208 at which a determination is made as to whether the wagerer won the bet only when the second team lost the game to the first team by less than the number of positive points for the spread bet that the first team would win the game. If not then process 1200 terminates at step 1290. Otherwise, process 1200 moves to step 1210 at which at which a donation to be made by the booking entity is derived. The derivation for the donation can use: (i) a currency amount of the bet; and (ii) factor(s) selected from: (a) the probability of the outcome actually occurring at the time when the outcome actually occurred; (b) the predetermined winning odds threshold; and (c) a combination of the foregoing.

After step 1210 in process 1200 in FIG. 12, step 1212 initiates a transmission of the donation to be made by the booking entity to one or more logical addresses; (i) the Wagerer; (ii) the Wagerer Selected Affinity Entity; (iii) the Wagerer Designated logical address(es); (iv) the booking entity. In such cases, the wagerer may wish that a notice be sent to allies of the selected affinity entity as to the forthcoming donation such that the wagerer will provide the logical address(es) for such purposes as discussed elsewhere herein. In process 1200 in FIG. 12, step 1214 the booking entity may send and receive back responses from the wagerer for a survey for uses as described elsewhere herein.

Figure 13:
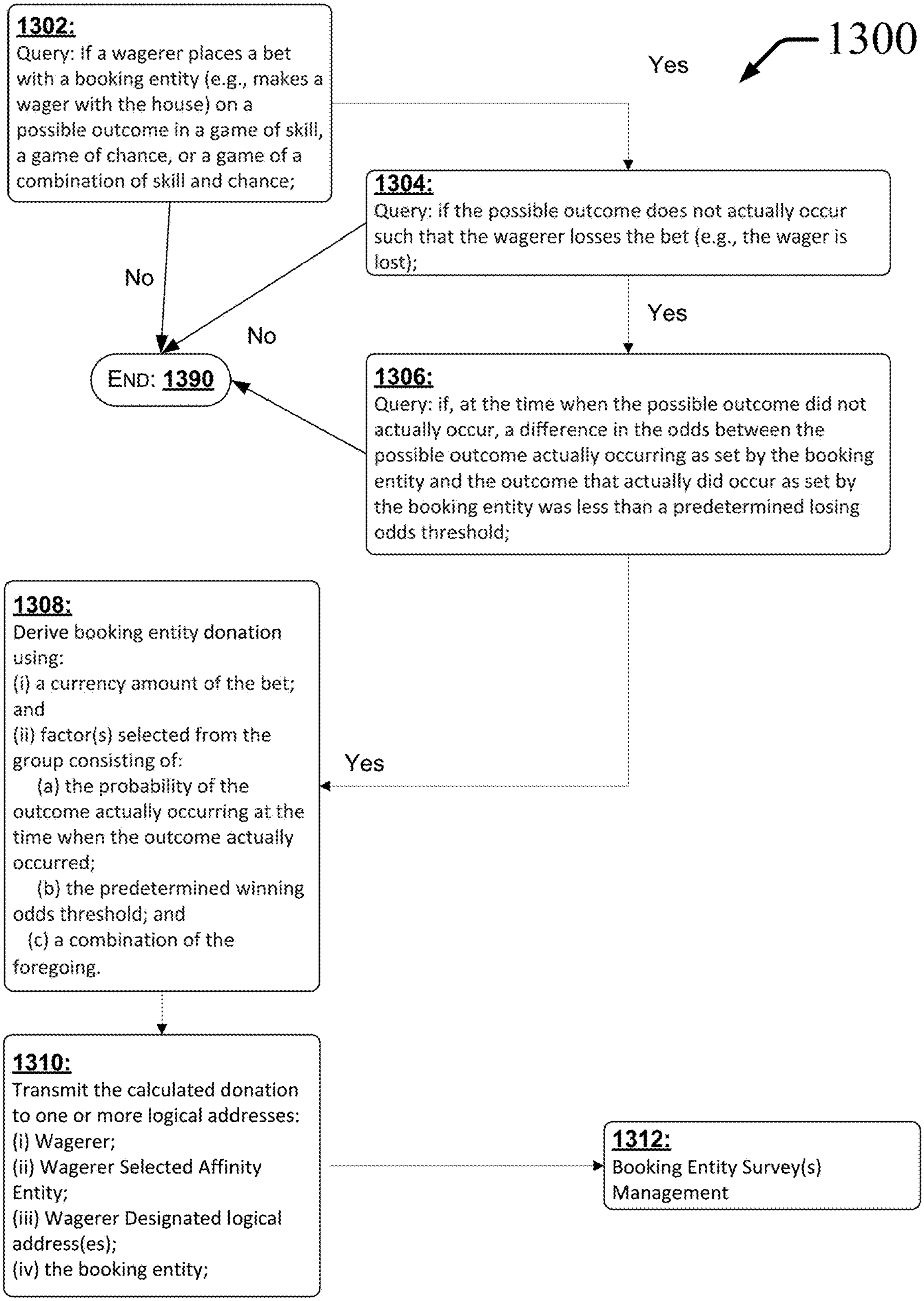

In process 1300 in FIG. 13, a query is made at step 1302 as to whether a wagerer has placed a bet with a booking entity (e.g., makes a wager with the house) on a possible outcome in a game of skill, a game of chance, or a game of a combination of skill and chance. If not then process 1300 terminates at step 1390. Otherwise, process 1300 moves to step 1304 at which a determination is made as to whether the possible outcome does not actually occur such that the wagerer losses the bet (e.g., the wager is lost). If not then process 1300 terminates at step 1390. Otherwise, process 1300 moves to step 1306 at which a determination is made as to whether, at the time when the possible outcome did not actually occur, a difference in the odds between the possible outcome actually occurring as set by the booking entity and the outcome that actually did occur as set by the booking entity was less than a predetermined losing odds threshold. If not then process 1300 terminates at step 1390. Otherwise, process 1300 moves to step 1308 at which a donation to be made by the booking entity is derived. The derivation for the donation can use: (i) a currency amount of the bet; and (ii) factor(s) selected from: (a) the probability of the outcome actually occurring at the time when the outcome actually occurred; (b) the predetermined winning odds threshold; and (c) a combination of the foregoing.

After step 1310 in process 1300 in FIG. 13, step 1312 initiates a transmission of the donation to be made by the booking entity to one or more logical addresses; (i) the Wagerer; (ii) the Wagerer Selected Affinity Entity; (iii) the Wagerer Designated logical address(es); (iv) the booking entity. In such cases, the wagerer may wish that a notice be sent to allies of the selected affinity entity as to the forthcoming donation such that the wagerer will provide the logical address(es) for such purposes as are also described elsewhere herein. In process 1300 in FIG. 13, step 1314 the booking entity may send and receive back responses from the wagerer for a survey for uses as described elsewhere herein.

One purpose of step 1306 of process 1300 in FIG. 13 is to provide a wagerer with a particular type of incentive to make a wager with a booking entity. In this particular type of incentive, the odds of winning the wager are substantially improbable, where the wager is lost at the time of the corresponding wager event, but where the loss of the wager was substantially improbably because the loss was by a substantially improbably small margin.

By way of illustration, and not by way of limitation, of step 1306, a booking entity may set a point spread bet on a wager on the margin of victory in a sporting event, for instance a football or basketball game. Where one team in the specific sporting event is favored to win, then that team must win the game by a certain number of points and that teams is so designated by a minus sign next to that team's margin in the point spread bet. The other team is the underdog, which team can lose within a certain margin, or win the game outright, to win the wager. The underdog will be designated with a plus sign in the point spread bet that is set by the booking entity. If Team-A is playing Team-B in the specific sporting event, and the point spread bet for Team-A is −250, this means that Team-A is favored to win the specific sporting event by 250 points. The favorite team is understood by a wagerer to be Team-A because of the designation of the minus sign which mean that Team-A is favored and therefore perceived to be more likely to win the competition. As such, Team-A needs to win by 250 points or more for the wagerer to win the wager. If the point spread for Team-B is +249.5, then Team-B needs to either lose by 1-249 points, or win the game, to cover the spread and for the wagerer win the bet. The plus signs indicates that Team-B is not the team that is favored to win the competition (e.g., the underdog team). If the point spread bet is a whole number (e.g., Team B +250), and Team-A wins by exactly by that whole number (Team-A wins by exactly 250 points), then the booking entity will refund to the wager the wagered amount on the wager. Given the above point spread bet illustration, as example of step 1306 of process 1300 in FIG. 13, a determination is made as to whether, at the time when the possible outcome did not actually occur, a difference in the odds between the possible outcome actually occurring as set by the booking entity and the outcome that actually did occur as set by the booking entity was less than a predetermined losing odds threshold. In this case, as an incentive from the booking entity to the wagerer to place the bet, the predetermined losing odds threshold might be set by the booking entity such that the booking entity will make a donation if Team-B losses by two percent (2%) or less of the point spread bet for Team-A which is currently set by the booking entity at −250. So, the booking entity will make the donation if Team-B loses the competition with Team-A by less than five (5) points. Note, however, that the incentive from the booking entity to the wagerer to place the bet might be further conditioned by the booking entity such that the booking entity will make a donation only if the amount of the wager exceeds a predetermined minimum wager. By way of example, and not by way of limitation, the booking entity might define the conditions under which the donation will be made to include both; (i) Team-B losing by two percent (2%) or less of the point spread bet; and (ii) the amount of the wager that is wagered by the wagerer must be at least Five Hundred Dollars ($500.00 US).

The implementations of the systems and methods described herein above may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for interprocess communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer usable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may involve the execution of transaction and transfer of value between merchants and consumers to provide economic and commercial benefits. One should appreciate that the systems and methods described herein may involve particular configuration of computer hardware components to provide incentives to consumers and transfer value between consumers, merchants, card issuers, and affinity entities. One should appreciate that the systems and methods described herein may involve an interconnected network of computer hardware for transferring electronic data signals and executing transactions.

The above discussion provides many example implementation of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously.

In at least some implementations, the system may include one or more processors (e.g., digital signal processors, microprocessors, etc.), each being adapted to execute instructions to perform at least some of the methods, operations, and processes described herein with respect to the figures. Such instructions may be stored or held in storage media as instructions.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

By way of example, the VR headset 302B seen in FIG. 3 communicates with a network via data transmission carrier 308. Such access may be programmed using server-client coding methodologies, an application executing on the former can be a thin client mobile web browser or an application specific to perform implementations described herein. Such a specific application can be coded to execute on a mobile device running an open-source operating system. For example, the Tizen operating system can be used as the operating system for the VR headset 302B seen in FIG. 3.

The VR headset 302B can be used by the wagerer to submit a wagerer loyalty identity identifier to the booking entity 104 (e.g., a casino). The VR identify identifier authenticates the wagerer, and allows for there to be a receiving of information from, and/or update information to the wagerer's loyalty identity identifier-related data based on the wagers placed by the wagerer.

Any networked computing device depicted in environment 300 seen in FIG. 3 may reside on including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. Each networked computing device may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. One or more of the networked computing devices may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. One or more of the networked computing devices may include one or more input devices, such as a keyboard, mouse, camera, touch screen and a microphone, and may also include one or more output devices such as a display screen and a speaker. One or more of the networked computing devices may include a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although a VR casino may have only one loyalty system, there may be multiple loyalty systems or groups of loyalty systems distributed over a wide geographic area and connected via e.g. network. One or more of the networked computing devices may include may be connected to the Internet or other network in order to interact and connect with one or more booking entities 304, one or more wagerer funds holding financial institutions 302C, one or more affinity entities 306.

The herein described databases for storage media may comprise primary, secondary, and/or tertiary storage media. Primary storage media may include memory such as random access memory and/or read-only memory, for example. Secondary storage media may include a mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor. Network accessible databases 310-326 shown in FIG. 3 may provide a persistent store for other databases described herein.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to tangible actions or processes of a specific apparatus, such as a special purpose computer or a similar special purpose electronic computing device that generate discernible results. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, various other modifications may be made, and equivalents may be substituted, without departing from claimed subject matter. Additionally, many modifications may be made to adapt a particular situation to the teachings of claimed subject matter without departing from the central concept described herein. Therefore, embodiments may not be limited to the particular examples disclosed, but may also include all aspects falling within the scope of appended claims, and equivalents thereof.

The various steps or acts in a method or process may be performed in the order shown, or may be performed in another order. Additionally, one or more process or method steps may be omitted or one or more process or method steps may be added to the method and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in non-transitory computer readable medium that can be loaded onto a general-purpose computer, a special purpose computer, or other programmable apparatus.

In the preceding detailed description, numerous specific details have been set forth to provide a thorough understanding of embodiments described herein. However, some embodiments may be practiced without these specific details. In other instances, methods and systems that would be known by one of ordinary skill have not been described in detail so as not to obscure claimed subject matter.

What is claimed is:

1. A method comprising:

receiving and sending interactive network communications, respectively from and to, a virtual reality headset worn by a real world wagerer, wherein the interactive network communications include renderings of a virtual reality competition taking place in real time in a metaverse environment;

receiving, via the interactive network communications, from the wagerer:

an identification of an affinity entity; and a wager placed by the wagerer on a possible outcome of the competition;

when:

the possible outcome of the competition actually occurs in the competition such that the wagerer wins the wager;

and the possible outcome of the competition actually occurs at a time in the competition when the probability of the possible outcome occurring during the competition did not exceed a predetermined winning odds threshold;

then:

crediting a donation of an amount to an account corresponding to the affinity entity, wherein the amount of the donation is derived using;

a currency amount of the wager;

and a factor selected from the group consisting of:

the probability of the outcome actually occurring at the time when the outcome actually occurred;

the predetermined winning odds threshold;

and a combination of the foregoing.

2. The method as defined in claim 1, wherein:

the competition is a pugilistic virtual reality (VR) competition wagering event between a first contestant and second contestant that can be won by only one of the first contestant and the second contestant;

each of the first contestant and the second contestant is identified by a geographic location;

the wager placed by the wagerer designates one of the first contestant and the second contestant;

the affinity entity is identified by a geographic location; and the donation to the affinity entity is credited only when a distance between the geographic location of the affinity and a geographic location of the one of the first contestant and the second contestant who wins the contest does not exceed a predetermined travel threshold.

3. The method as defined in claim 1, wherein:

the competition can be won by only one of a first team and a second team;

the wager placed by the wagerer is that the second team will win the competition;

at the time when the possible outcome actually occurred, there was a number of positive points for a spread bet that the first team would win the competition as set by the booking entity;

and the wagerer won the wager only when the second team lost the competition to the first team by less than the number of positive points for the spread bet that the first team would win the competition.

4. The method as defined in claim 2, wherein the predetermined travel threshold is derived using:

a web mapping platform using an online navigation algorithm; and one or more travel modes used by the navigation algorithm.

5. The method as defined in claim 1, wherein prior to said receiving and sending interactive network communications, respectively from and to, the virtual reality headset worn by the real world wagerer, assessing a spectator access fee to the real world wagerer to spectate the virtual reality competition taking place in real time in the metaverse environment.

6. The method as defined in claim 1, wherein:

the wager is received by a booking entity; and the time that the probability of the possible outcome occurs is set by the booking entity.

7. The method as defined in claim 1, wherein:

the wager is received by a booking entity; and the probability of the possible outcome occurs during the competition is set by the booking entity.

8. The method as defined in claim 1, wherein:

the wager is received by a booking entity; and the donation of the amount to the account corresponding to the affinity entity is debited to an account corresponding to the booking entity.

9. The method as defined in claim 2, wherein the wager placed by the wagerer on the possible outcome of the pugilistic VR competition wagering event, said event having a plurality of rounds, is selected from the group consisting of:

a technical knockout;

a straight knockout;

a disqualification for one of the first contestant and the second contestant;

a time by which the competition will be decided; and a round during which competition will be decided.

10. The method as defined in claim 1, wherein the probability of the outcome actually occurring at the time during the competition results in:

a larger said donation when said probability of the outcome actually occurring at the time during the competition is larger; and a smaller said donation when said probability of the outcome actually occurring at the time during the competition is smaller.

11. The method as defined in claim 1, wherein the amount of the donation is proportional to the probability of the outcome actually occurring at the time.

12. A non-transitory, computer readable medium or media having stored thereon computer-interpretable instructions which when executed by hardware performs the method defined in claim 1.

13. A method comprising:

receiving and sending interactive network communications, respectively from and to, a virtual reality headset worn by a real world wagerer, wherein the interactive network communications include renderings of a virtual reality competition taking place in real time in a metaverse environment;

receiving, via the interactive network communications, from the wagerer:

an identification of an affinity entity; and a wager placed by the wagerer on a possible outcome of the competition;

when:

the possible outcome of the competition did not actually occur in the competition such that the wagerer loses the wager;

and at the time when the possible outcome did not actually occur, an odds difference in:

the probability of the possible outcome actually occurring; and the probability of the possible outcome of the competition not actually occurring in the competition is less than a predetermined losing odds threshold;

then:

crediting a donation of an amount to an account corresponding to the affinity entity, wherein the amount of the donation is derived using:

a currency amount of the wager;

and the odds difference.

14. The method as defined in claim 13, wherein:

the competition a pugilistic virtual reality (VR) competition wagering event between a first contestant and second contestant that can be won by only one of the first contestant and the second contestant;

each of the first contestant and the second contestant is identified by a geographic location;

the wager placed by the wagerer designates one of the first contestant and the second contestant;

the affinity entity is identified by a geographic location; and the donation to the affinity entity is credited only when a distance between the geographic location of the affinity and a geographic location of the one of the first contestant and the second contestant who wins the contest does not exceed a predetermined travel threshold.

15. The method as defined in claim 14, wherein prior to said receiving and sending interactive network communications, respectively from and to, the virtual reality headset worn by the real world wagerer, assessing a spectator access fee to the real world wagerer to spectate the virtual reality competition taking place in real time in the metaverse environment.

16. The method as defined in claim 13, wherein:

the wager is received by a booking entity;

the time that the probability of the possible outcome occurs is set by the booking entity;

the probability of the possible outcome occurs during the competition is set by the booking entity;

the donation of the amount to the account corresponding to the affinity entity is debited to an account corresponding to the booking entity.

17. A non-transitory, computer readable medium or media having stored thereon computer-interpretable instructions which when executed by hardware performs the method defined in claim 13.

18. A method comprising:

assessing a spectator access fee to a real world wagerer to spectate a virtual reality competition taking place in real time in a metaverse environment;

receiving and sending interactive network communications, respectively from and to, the virtual reality headset worn by the real world wagerer, wherein the interactive network communications include renderings of the virtual reality competition taking place in real time in the metaverse environment;

receiving, via the interactive network communications, from the wagerer:

an identification of an affinity entity; and a wager placed by the wagerer on a possible outcome of the competition, wherein:

the competition is a contest that can be won by only one of plurality of contestants each having a geographic location;

the wager placed by the wagerer is that the one said contestant will win the contest;

the affinity entity has a geographic location;

the one said contestant who wins the contest has a geographic location:

the contest can be won by only one of a first team and a second team;

the wager placed by the wagerer that the second team will win the contest;

at the time when the possible outcome actually occurred, there was a number of positive points for a spread bet that the first team would win the contest as set by a booking entity;

and the wagerer won the wager only when the second team lost the contest to the first team by less than the number of positive points for the spread bet that the first team would win the contest;

and when:

a distance between the geographic location of the affinity and a geographic location of the one said contestant who wins the contest does not exceed a predetermined travel threshold;

the possible outcome of the competition actually occurs in the competition such that the wagerer wins the wager;

and the possible outcome of the competition actually occurs at a time in the competition when the probability of the possible outcome occurring during the competition did not exceed a predetermined winning odds threshold;

then:

crediting a donation of an amount to an account corresponding to the affinity entity, wherein the amount of the donation is derived using;

a currency amount of the wager;

and a factor selected from the group consisting of:

the probability of the outcome actually occurring at the time when the outcome actually occurred;

the predetermined winning odds threshold;

and a combination of the foregoing.

19. The method as defined in claim 18, wherein the competition is of a competition type selected from the group consisting of:

a competition of skill;

a competition of chance; and a competition of a combination of skill and chance.

20. A non-transitory, computer readable medium or media having stored thereon computer-interpretable instructions which when executed by hardware performs the method defined in claim 19.

* * * * *